(12) United States Patent
Yamazaki

(10) Patent No.: US 11,249,441 B2
(45) Date of Patent: Feb. 15, 2022

(54) ELECTRONICALLY CONTROLLED MECHANICAL TIMEPIECE, CONTROL METHOD OF AN ELECTRONICALLY CONTROLLED MECHANICAL TIMEPIECE, AND ELECTRONIC TIMEPIECE

(71) Applicant: Seiko Epson Corporation, Tokyo (JP)

(72) Inventor: Yutaka Yamazaki, Okaya (JP)

(73) Assignee: Seiko Epson Corporation

( * ) Notice: Subject to any disclaimer, the term of this patent is extended or adjusted under 35 U.S.C. 154(b) by 431 days.

(21) Appl. No.: 16/429,602

(22) Filed: Jun. 3, 2019

(65) Prior Publication Data
US 2019/0369560 A1 Dec. 5, 2019

(30) Foreign Application Priority Data

Jun. 4, 2018 (JP) .............................. JP2018-106871
Jan. 22, 2019 (JP) .............................. JP2019-008520

(51) Int. Cl.
*G04B 17/22* (2006.01)
*G01K 7/20* (2006.01)
*G04C 3/08* (2006.01)

(52) U.S. Cl.
CPC .............. *G04B 17/22* (2013.01); *G01K 7/203* (2013.01); *G04C 3/08* (2013.01)

(58) Field of Classification Search
CPC ........ G04B 17/00; G04B 17/20; G04B 17/22; G04C 3/08; G04C 3/107; G04C 3/108; G04G 3/04; G01K 7/203
See application file for complete search history.

(56) References Cited

U.S. PATENT DOCUMENTS

| 3,828,278 A * | 8/1974 | Rees .................... H03K 3/3545 331/116 FE |
| 4,453,834 A | 6/1984 | Suzuki et al. |

(Continued)

FOREIGN PATENT DOCUMENTS

| JP | S61-045986 A | 3/1986 |
| JP | H06-031731 B2 | 4/1994 |

(Continued)

OTHER PUBLICATIONS

Extended European Search Report for Patent Application No. EP 19177640.0 dated Oct. 16, 2019 (5 pages).

*Primary Examiner* — Edwin A. Leon
*Assistant Examiner* — Jason M Collins
(74) *Attorney, Agent, or Firm* — Harness, Dickey & Pierce, P.L.C.

(57) ABSTRACT

Provided are a timepiece having a temperature compensator drivable by a low voltage with low current consumption, and a control method of a timepiece. The timepiece includes an arithmetic circuit, a first switch that controls connection of a temperature compensation table storage to a power supply circuit, and a second switch that controls connection of a device-difference compensation data storage to the power supply circuit. The arithmetic circuit calculates a compensation amount based on a temperature measured by a temperature detector, a temperature compensation data, a device-difference compensation data, and outputs to a frequency adjustment control circuit and a theoretical regulation circuit. The first switch is controlled to the connect state during a first power supply connection period including a temperature compensation data read period. The second switch is controlled to the connect state during a second power supply connection period including a device-difference compensation data read period.

8 Claims, 16 Drawing Sheets

(56) References Cited

U.S. PATENT DOCUMENTS

| | | | |
|---|---|---|---|
| 4,761,771 A | | 8/1988 | Moriya et al. |
| 6,021,097 A | * | 2/2000 | Kanno ................... G04C 3/14 368/157 |
| 6,314,059 B1 | * | 11/2001 | Shimizu ................. G04C 3/00 368/157 |
| 6,414,909 B1 | * | 7/2002 | Shimizu ................ G04C 3/008 310/75 A |
| 6,636,459 B1 | * | 10/2003 | Nagata ................. G04C 10/00 368/203 |
| 2003/0128631 A1 | | 7/2003 | Nakamura et al. |
| 2004/0013047 A1 | | 1/2004 | Shimizu et al. |
| 2005/0036405 A1 | * | 2/2005 | Born ................... G04C 11/084 368/127 |
| 2014/0219067 A1 | | 8/2014 | Hessler |
| 2017/0255167 A1 | | 9/2017 | Yamazaki |
| 2019/0018368 A1 | * | 1/2019 | Bracco .................. G04B 17/00 |

FOREIGN PATENT DOCUMENTS

| | | |
|---|---|---|
| JP | H11-014767 A | 1/1999 |
| JP | 2000-346962 A | 12/2000 |
| JP | 2001-235567 A | 8/2001 |
| JP | 2004-003980 A | 1/2004 |
| JP | 2006-220664 A | 8/2006 |
| JP | 2014-149256 A | 8/2014 |
| JP | 2014-153365 A | 8/2014 |
| JP | 2014-178180 A | 9/2014 |

* cited by examiner

ELECTRONICALLY CONTROLLED MECHANICAL TIMEPIECE, CONTROL METHOD OF AN ELECTRONICALLY CONTROLLED MECHANICAL TIMEPIECE, AND ELECTRONIC TIMEPIECE

The present application is based on, and claims priority from, JP Application Serial Number 2018-106871, filed Jun. 4, 2018, and JP Application Serial Number 2019-008520, filed Jan. 22, 2019, the disclosure of which are hereby incorporated by reference herein in their entireties.

BACKGROUND

1. Technical Field

The present invention relates to an electronically controlled mechanical timepiece, a control method of an electronically controlled mechanical timepiece, and an electronic timepiece.

This application claims priority based upon Japanese Patent Application 2018-106871, filed on Jun. 4, 2018, and Japanese Patent Application 2019-008520, filed on Jan. 22, 2019, the entire contents of which are incorporated by reference herein.

2. Related Art

Electronically controlled mechanical timepieces configured to precisely drive hands affixed to a wheel train and accurately display the time by charging a power circuit with electrical energy generated by driving an electrical generator by means of mechanical energy produced by a spring unwinding, and controlling rotation of the rotor of the generator by operating a brake control circuit by means of the electrical energy, are known from the literature. See, for example, JP-A-2000-346962.

In an electronically controlled mechanical timepiece, the torque (mechanical energy) applied by the spring to the generator is set so that the hands turn at a faster rate than a reference speed, and regulate the rotational speed by means of a brake control device braking the generator.

More specifically, a reference signal based on the oscillation signal output from a crystal oscillator is compared with a rotation detection signal corresponding to the rotational period of the rotor of the generator, and the amount of braking to apply to the generator is set to regulate the generator. An electronically controlled mechanical timepiece can therefore maintain time accuracy corresponding to the precision of the reference signal.

Because a crystal oscillator has a specific thermal characteristic, if the temperature of the operating environment of the electronically controlled mechanical timepiece varies greatly from the normal temperature (such as 25° C.) used as the reference temperature of the thermal characteristic, the oscillation frequency of the crystal oscillator changes, the frequency of the reference signal changes, and the accuracy of the time kept by the electronically controlled mechanical timepiece decreases. This can conceivably be compensated for by providing a temperature compensation function (temperature compensator) enabling temperature compensation of the crystal oscillator.

However, providing a temperature compensator increases current consumption. As the spring unwinds in an electronically controlled mechanical timepiece, the torque applied to the generator decreases and the generated energy output of the generator drops. As a result, when the current consumption of the temperature compensator is high, the energy balance decreases when the mechanical energy applied to the generator by the spring is low, output voltage sufficient to drive the temperature compensator and the brake control device cannot be produced, and accurate regulation control cannot be maintained. More specifically, the autonomy of accurate operation of the electronically controlled mechanical timepiece becomes shorter.

A temperature compensator (temperature compensation function) that can be driven with low current consumption and low voltage in an electronically controlled mechanical timepiece so that the brake control device and temperature compensator can continue operating even when the torque applied to the generator is low and the generated power output is low therefore needed.

A temperature compensator (temperature compensation function) that can be driven with low current consumption and low voltage is also desirable in a typical electronic timepiece using a crystal oscillator.

SUMMARY

An object of the present invention is to provide an electronically controlled mechanical timepiece having a temperature compensator that can be driven with low current consumption and low voltage, a control method of an electronically controlled mechanical timepiece, and an electronic timepiece.

An electronically controlled mechanical timepiece according to an aspect of the invention includes: a mechanical energy source; a generator including a rotor driven by the mechanical energy source; an energy transfer mechanism configured to transfer torque from the mechanical energy source to the rotor; a time display device connected to the energy transfer mechanism and configured to display time; a rotation controller that controls rotation of the rotor; a crystal oscillator; and a power supply circuit that stores electrical energy generated by the generator.

The rotation controller includes an oscillation circuit that causes the crystal oscillator to oscillate, a frequency divider that frequency divides an oscillation signal output from the oscillation circuit and outputs a reference signal, a temperature compensator configured to compensate for variation in the reference signal due to temperature, a rotation detection circuit configured to measure the rotational frequency of the rotor, and a brake control circuit configured to control braking the rotor according to a difference between the rotational frequency of the rotor and the frequency of the reference signal.

The temperature compensator includes a frequency adjustment control circuit configured to control the oscillation circuit, a theoretical regulation circuit configured to control the frequency divider, a temperature detector configured to measure temperature, an arithmetic circuit, temperature compensation table storage in which temperature compensation data common to electronically controlled mechanical timepieces is stored, device-difference compensation data storage in which device-difference compensation data for the electronically controlled mechanical timepiece is stored, a first switch configured to control connection and disconnection of the temperature compensation table storage to the power supply circuit, and a second switch configured to control connection and disconnection of the device-difference compensation data storage to the power supply circuit.

The arithmetic circuit calculates a compensation amount based on a measured temperature detected by the temperature detector, the temperature compensation data, and the device-difference compensation data, and outputs to the frequency adjustment control circuit and the theoretical regulation circuit. The first switch is controlled to a connect state during a first power supply connection period including a temperature compensation data read period when at least the temperature compensation data is read from the temperature compensation table storage, and to a disconnect state when not in the first power supply connection period. The second switch controlled to a connect state during a second power supply connection period including a device-difference compensation data read period when at least the device-difference compensation data is read from the device-difference compensation data storage, and to a disconnect state when not in the second power supply connection period.

An electronically controlled mechanical timepiece according to this aspect of the invention has a generator that is driven by a mechanical energy source such as a spring, and by regulating the rotational speed of the rotor of the generator, accurately drives the hands of the time display, and includes an arithmetic circuit that calculates compensation based on the temperature measured by the temperature detector; a frequency adjustment control circuit that adjusts the frequency of the oscillation signal by controlling additional capacitance of the oscillation circuit based on the compensation; and a theoretical regulation circuit that controls the frequency divider based on the compensation and changes the timing of signal change in the reference signal output from the frequency divider.

As a result, by making coarse adjustments with the theoretical regulation circuit, and fine adjustments with the frequency adjustment control circuit, compensation for the thermal characteristics of the crystal oscillator, for example, is possible, the frequency precision of the reference signal can be improved, and time accuracy can be improved even when the temperature of the electronically controlled mechanical timepiece changes according to the operating environment.

Because temperature compensation table storage storing data common to electronically controlled mechanical timepieces, and device-difference compensation data storage storing compensation data for individual differences between electronically controlled mechanical timepieces, are provided, compensation data can be efficiently stored, and the footprint of the IC can be reduced. More specifically, because rewriting data to the temperature compensation table storage is not necessary, the temperature compensation table storage can be configured using mask ROM enabling reducing the circuit scale, and rewritable nonvolatile memory can be used to store only the device-difference compensation data, the space occupied in the IC can be reduced. Reducing the size of the device-difference compensation data storage also enables reducing operating current and leakage current when not operating.

Furthermore, because there are a first switch and a second switch between the temperature compensation table storage and device-difference compensation data storage and the power supply circuit, the temperature compensation table storage and device-difference compensation data storage can be connected to the power supply circuit only when reading compensation data, can be disconnected from the power supply circuit when not reading, and leakage current when not reading from storage can therefore be reduced.

More particularly, because leakage current increases when the internal temperature of the electronically controlled mechanical timepiece rises, the effect of reducing leakage current can be increased by isolating the storage from the power supply circuit. Because the electronically controlled mechanical timepiece charges the generated electrical energy to a capacitor or other power supply circuit and drives the IC by voltage from the power supply circuit, if the current consumption of the IC increases, the discharge from the power supply circuit increases, and the voltage of the power supply circuit decreases. If this voltage goes below the voltage at which the IC stops operating (IC stop-operating voltage), the IC will stop and regulation cannot be controlled. Therefore, if current consumption by the IC is low, voltage sufficient to drive the IC can still be acquired even when the mechanical energy applied from the spring is low, and the autonomy of the electronically controlled mechanical timepiece can be improved.

Furthermore, by combining a theoretical regulation circuit and a frequency adjustment control circuit, a temperature compensator capable of fine frequency control with low current consumption can be provided. More specifically, a theoretical regulation circuit can suppress increasing current consumption, but does not enable fine adjustment of the reference signal. In addition, the frequency adjustment control circuit can finely adjust the reference signal, but the additional capacitance must be increased greatly to increase the adjustment range, and current consumption increases by increased charging and discharging of the additional capacitance.

By combining a theoretical regulation circuit and frequency adjustment control circuit with these characteristics, the invention enables precise adjustment of the reference signal while also reducing current consumption.

In an electronically controlled mechanical timepiece according to another aspect of the invention, the rotation controller includes a constant voltage circuit; the oscillation circuit, frequency divider, brake control circuit, temperature compensator, frequency adjustment control circuit, arithmetic circuit, and temperature detector are driven by a constant voltage output from the constant voltage circuit; and the temperature compensation table storage and device-difference compensation data storage are driven by a power source other than the constant voltage circuit.

Because the constant voltage circuit can output a fixed voltage even if the voltage (generated voltage) of the power supply circuit charged by the generator fluctuates, if the oscillation circuit and temperature detector are driven by a constant voltage, increasing the current consumption can be prevented even if the generated voltage increases. In addition, by driving the oscillation circuit and temperature detector at a fixed voltage, fluctuation due to the output signal voltage can be reduced. As a result, low current consumption and high precision can be achieved in an electronically controlled mechanical timepiece that requires low current consumption.

Furthermore, because current consumption increases during operation if nonvolatile memory, for example, is used for the temperature compensation table storage and device-difference compensation data storage, if the storage is driven by a constant voltage circuit, the output voltage of the constant voltage circuit may fluctuate. Voltage fluctuation in the constant voltage circuit can cause variation in the frequency of the output signal of the oscillation circuit and operation of the oscillation circuit to stop. As a result, the temperature compensation table storage and device-difference compensation data storage are driven by a power supply other than the constant voltage circuit that drives the oscillation circuit and temperature detector, such as by the voltage at the ends of a power supply circuit (capacitor).

Therefore, even if the voltage of the power supply circuit drops due to the current consumption of temperature compensation table storage and device-difference compensation data storage operation, the effect on the output of the constant voltage circuit is reduced, and variation in the frequency of the output signals from the oscillation and temperature detector, as well as operation of the oscillation circuit stopping, can be prevented.

In addition, because the output voltage of the constant voltage circuit can be set low within the range not below the stop-operating voltage of the oscillation circuit and temperature detector, the IC can be driven with low current consumption. Generated voltage sufficient to drive the IC can therefore be sustained even when the mechanical energy supplied from the spring is low, and autonomy can be increased.

In an electronically controlled mechanical timepiece according to another aspect of the invention, the temperature measurement period when the temperature detector operates, the temperature compensation data read period, and the device-difference compensation data read period are set to different times.

Because the electrical energy generated in an electronically controlled mechanical timepiece is relatively low, a capacitor with lower internal resistance than a storage battery is preferably used in the power supply circuit. Because a capacitor has lower capacitance than a storage battery, the voltage drop from a current load increases. As a result, if a temperature detector requiring a relatively large operating current, the temperature compensation table storage, and the device-difference compensation data storage in the circuits used in the electronically controlled mechanical timepiece operate at the same time, the current load rises, the voltage of the power supply circuit (capacitor) will drop and may go below the voltage at which IC operation stops. If the IC stops operating, movement of the hands cannot be controlled, and the accurate time cannot be displayed.

Therefore, by setting the temperature measurement period when the temperature detector operates, the temperature compensation data read period, and the device-difference compensation data read period to different times, and controlling operation so these periods do not overlap, the current load can be dispersed, and a voltage drop in the power supply circuit going below the stop-operating voltage of the IC can be prevented. Therefore, the generated voltage dropping below the voltage at which IC operation stops is prevented, accurate regulation can be maintained, and autonomy can be improved even when the mechanical energy applied from the spring is low, and the voltage generated at the ends of the power supply circuit is low.

In an electronically controlled mechanical timepiece according to another aspect of the invention, the rotation controller is configured by an IC manufactured in an SOI process; and the device-difference compensation data storage is configured by FAMOS.

Data stored in the device-difference compensation data storage is data for adjusting individual differences in the characteristics of the oscillation circuit and temperature detector to the ideal characteristics, and this data must be written during the mass production processes of an electronically controlled mechanical timepiece. The device-difference compensation data storage is therefore configured with nonvolatile memory in which the written data is not erased when there is no voltage from the power supply circuit. The nonvolatile memory is normally nonvolatile memory that can be written multiple times, such as EEPROM. However, a high voltage is required to write nonvolatile memory such as EEPROM. In addition, an IC manufactured in a SOI (Silicon On Insulator) process has a low breakdown voltage, and therefore cannot include nonvolatile memory that requires a high voltage to write.

As a result, FAMOS (Floating gate Avalanche injection Metal Oxide Semiconductor) memory is used as the nonvolatile memory for the device-difference compensation data storage. Because FAMOS memory can be written with a low voltage, exceeding the breakdown voltage and resulting device failure can be prevented even in a SOI process IC having a low breakdown voltage. A rotation controller (IC) manufactured in an SOI process and having a temperature compensator, low leakage current, and drivable by a low voltage can therefore be provided.

In an electronically controlled mechanical timepiece according to another aspect of the invention, the temperature detector is configured by a RC oscillator circuit driven by a constant current.

If a RC oscillator circuit driven by a constant current is used as the temperature detector, the constant current and resistance vary with the environmental temperature, a signal of a frequency corresponding to the environmental temperature is output from the RC oscillator circuit, and the temperature can be detected from the frequency. Furthermore, because the drive current of the temperature detector is determined by the constant current, the current can be easily controlled by the design, and low current consumption can be easily achieved.

Of current consumption is low, generated voltage sufficient to drive the IC can be sustained even when the mechanical energy supplied from the spring is low, and autonomy can be increased.

Another aspect of the invention is a control method of an electronically controlled mechanical timepiece including a mechanical energy source; a generator including a rotor driven by the mechanical energy source; an energy transfer mechanism configured to transfer torque from the mechanical energy source to the rotor; a time display device connected to the energy transfer mechanism and configured to display time; a rotation controller that controls rotation of the rotor; a crystal oscillator; and a power supply circuit that stores electrical energy generated by the generator; the rotation controller including an oscillation circuit that causes the crystal oscillator to oscillate, a frequency divider that frequency divides an oscillation signal output from the oscillation circuit and outputs a reference signal, a temperature compensator configured to compensate for variation in the reference signal due to temperature, a rotation detection circuit configured to measure the rotational frequency of the rotor, and a brake control circuit configured to control braking the rotor according to a difference between the rotational frequency of the rotor and the frequency of the reference signal; the temperature compensator including a temperature detector configured to measure temperature, temperature compensation table storage in which temperature compensation data common to electronically controlled mechanical timepieces is stored, device-difference compensation data storage in which device-difference compensation data specific to an electronically controlled mechanical timepiece is stored, a first switch configured to control connection and disconnection of the temperature compensation table storage to the power supply circuit, and a second switch configured to control connection and disconnection of the device-difference compensation data storage to the power supply circuit; and the control method including a step of operating the temperature detector to measure temperature; a step of setting the first switch to a connect state, reading the temperature compensation data from the temperature compensation table storage, and setting the first switch to a disconnect state; a step of setting the second switch to a connect state, reading the device-difference compensation data from the device-difference compensation data storage, and setting the second switch to a disconnect state; a step of calculating a compensation amount based on a measured temperature, the temperature compensation data, and the device-difference compensation data; a step of controlling the oscillation circuit according to the compensation; and a step of controlling the frequency divider according to the compensation.

This control method has the same effect as the electronically controlled mechanical timepiece described above.

An electronic timepiece according to another aspect of the invention includes a time display device configured to display time; a crystal oscillator; a power supply circuit; an oscillation circuit that causes the crystal oscillator to oscillate; a frequency divider that frequency divides an oscillation signal output from the oscillation circuit and outputs a reference signal; and a temperature compensator that compensates for variation in the reference signal due to temperature. The temperature compensator includes a frequency adjustment control circuit configured to control the oscillation circuit, a theoretical regulation circuit configured to control the frequency divider, a temperature detector configured to measure temperature, an arithmetic circuit, temperature compensation table storage in which temperature compensation data common to another electronic timepiece is stored, device-difference compensation data storage in which device-difference compensation data based on a characteristic of the crystal oscillator is stored, a first switch configured to control connection and disconnection of the temperature compensation table storage to the power supply circuit, and a second switch configured to control connection and disconnection of the device-difference compensation data storage to the power supply circuit. The arithmetic circuit calculates a compensation amount based on a measured temperature detected by the temperature detector, the temperature compensation data, and the device-difference compensation data, and outputs to the frequency adjustment control circuit and the theoretical regulation circuit, The first switch is controlled to a connect state during a first power supply connection period including a temperature compensation data read period when at least the temperature compensation data is read from the temperature compensation table storage, and to a disconnect state when not in the first power supply connection period. The second switch is controlled to a connect state during a second power supply connection period including a device-difference compensation data read period when at least the device-difference compensation data is read from the device-difference compensation data storage, and to a disconnect state when not in the second power supply connection period.

An electronic timepiece according to this aspect of the invention has a generator that is driven by a mechanical energy source such as a spring, and by regulating the rotational speed of the rotor of the generator, accurately drives the hands of the time display, and includes an arithmetic circuit that calculates compensation based on the temperature measured by the temperature detector; a frequency adjustment control circuit that adjusts the frequency of the oscillation signal by controlling additional capacitance of the oscillation circuit based on the compensation; and a theoretical regulation circuit that controls the frequency divider based on the compensation and changes the timing of signal change in the reference signal output from the frequency divider.

As a result, by making coarse adjustments with the theoretical regulation circuit, and fine adjustments with the frequency adjustment control circuit, compensation for the thermal characteristics of the crystal oscillator, for example, is possible, the frequency precision of the reference signal can be improved, and time accuracy can be improved even when the temperature of the electronic timepiece changes according to the operating environment.

Because temperature compensation table storage storing data common to electronic timepieces, and device-difference compensation data storage storing compensation data for individual differences between electronic timepieces, are provided, compensation data can be efficiently stored, and the footprint of the IC can be reduced. More specifically, because rewriting data to the temperature compensation table storage is not necessary, the temperature compensation table storage can be configured using mask ROM enabling reducing the circuit scale, and rewritable nonvolatile memory can be used to store only the device-difference compensation data, the space occupied in the IC can be reduced. Reducing the size of the device-difference compensation data storage also enables reducing operating current and leakage current when not operating.

Furthermore, because there are a first switch and a second switch between the temperature compensation table storage and device-difference compensation data storage and the power supply circuit, the temperature compensation table storage and device-difference compensation data storage can be connected to the power supply circuit only when reading compensation data, can be disconnected from the power supply circuit when not reading, and leakage current when not reading from storage can therefore be reduced.

More particularly, because leakage current increases when the internal temperature of the electronic timepiece rises, the effect of reducing leakage current can be increased by isolating the storage from the power supply circuit. Because the electronic timepiece drives the IC by voltage from the power supply circuit, if the current consumption of the IC increases, the discharge from the power supply circuit increases, and the voltage drop of the power supply circuit is faster than when the current consumption of the IC is low. If this voltage goes below the voltage at which the IC stops operating, the IC will stop and regulation cannot be controlled. In other words, the autonomy of the electronic timepiece becomes shorter. Therefore, because discharge from the power supply circuit decreases when current consumption by the IC is low, the voltage drop of the power supply circuit is also delayed, voltage sufficient to drive the IC can be maintained for a longer time, and the autonomy of the electronically controlled mechanical timepiece can be improved.

Furthermore, by combining a theoretical regulation circuit and a frequency adjustment control circuit, a temperature compensator capable of fine frequency control with low current consumption can be provided. More specifically, a theoretical regulation circuit can suppress increasing current consumption, but does not enable fine adjustment of the reference signal. In addition, the frequency adjustment control circuit can finely adjust the reference signal, but the additional capacitance must be increased greatly to increase the adjustment range, and current consumption increases by increased charging and discharging of the additional capacitance.

By combining a theoretical regulation circuit and frequency adjustment control circuit with these characteristics, the invention enables precise adjustment of the reference signal while also reducing current consumption.

An electronic timepiece according to another aspect of the invention preferably also has a constant voltage circuit that drives at least the oscillation circuit by a constant voltage; and the temperature compensation table storage and device-difference compensation data storage are driven by a power source other than the constant voltage circuit.

Because a constant voltage circuit outputs a fixed voltage even when the voltage of a power supply circuit configured by a primary battery or storage battery fluctuates, if at least the oscillation circuit is driven by a constant voltage, an increase in current consumption can be prevented even if the voltage of the power supply circuit increases. In addition, by driving the oscillation circuit by a constant voltage, fluctuation due to the voltage of the output signal can be reduced. As a result, low current consumption and high precision can be achieved in an electronic timepiece.

Furthermore, because current consumption increases during operation if nonvolatile memory, for example, is used for the temperature compensation table storage and device-difference compensation data storage, if the storage is driven by a constant voltage circuit, the output voltage of the constant voltage circuit may fluctuate. Voltage fluctuation in the constant voltage circuit can cause variation in the frequency of the output signal of the oscillation circuit and operation of the oscillation circuit to stop. As a result, the temperature compensation table storage and device-difference compensation data storage are driven by a power supply other than the constant voltage circuit that drives the oscillation circuit, such as by the voltage at the ends of a power supply circuit (primary battery or storage battery). Therefore, even if the voltage of the power supply circuit drops due to the current consumption of temperature compensation table storage and device-difference compensation data storage operation, the effect on the output of the constant voltage circuit is reduced, and variation in the frequency of the output signals from the oscillation detector, as well as operation of the oscillation circuit stopping, can be prevented.

In addition, because the output voltage of the constant voltage circuit can be set low within the range not below the stop-operating voltage of the oscillation circuit and temperature detector, the IC can be driven with low current consumption. Generated voltage sufficient to drive the IC can therefore be sustained even when the mechanical energy supplied from the spring is low, and autonomy can be increased.

Other objects and attainments together with a fuller understanding of the invention will become apparent and appreciated by referring to the following description and claims taken in conjunction with the accompanying drawings.

DESCRIPTION OF EMBODIMENTS

Configuration of an electronically controlled mechanical timepiece

Figure 1:
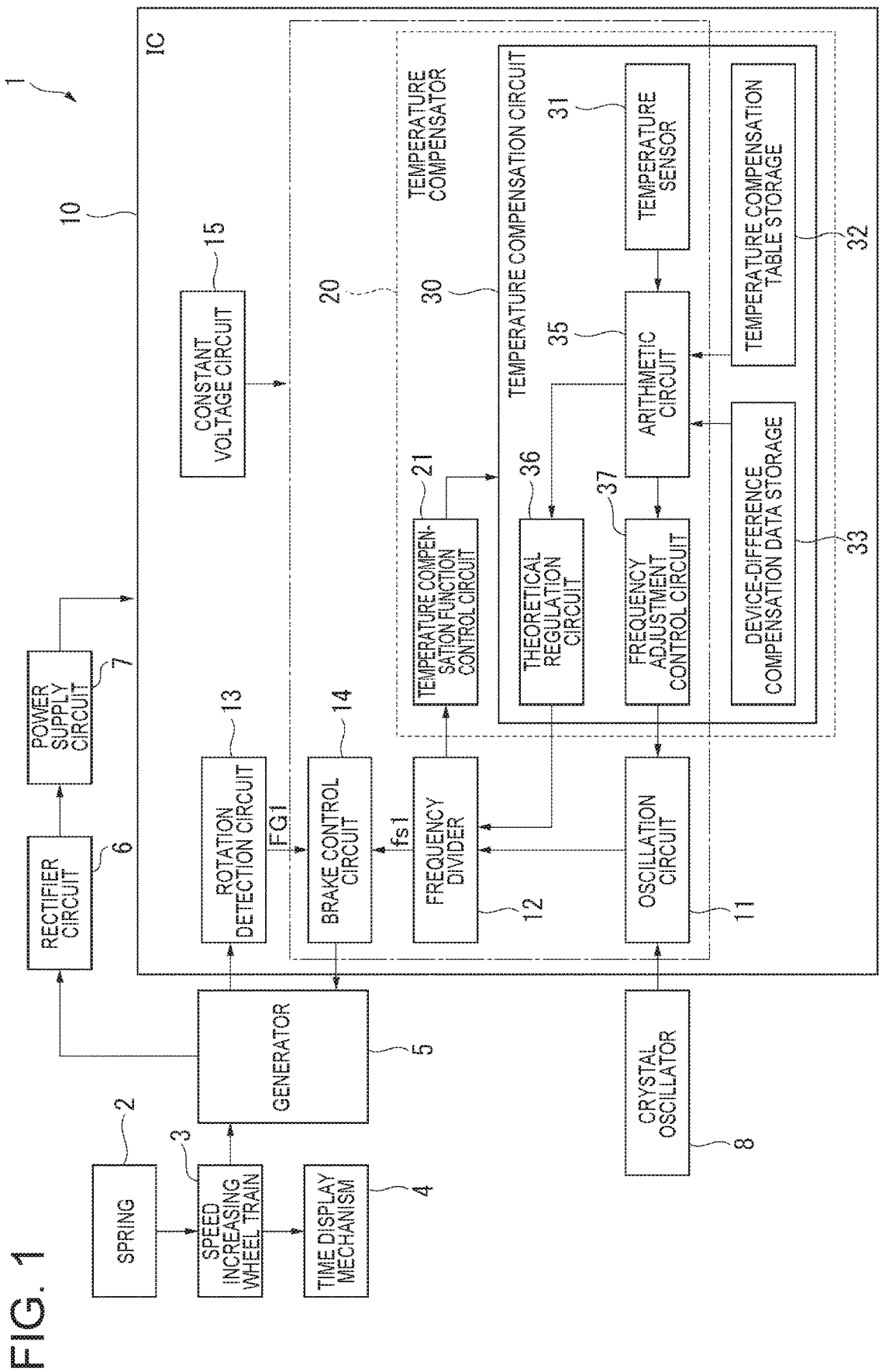
FIG. 1 is a block diagram illustrating the configuration of main parts of an electronically controlled mechanical timepiece according to a first embodiment of the invention.

FIG. 1 is a block diagram of an electronically controlled mechanical timepiece 1 according to a first embodiment of the invention.

The electronically controlled mechanical timepiece 1 has a spring 2 as a mechanical energy source; a speed increasing wheel train 3 as an energy transfer mechanism that transfers torque from the spring 2; a time display mechanism 4 that displays time in conjunction with the speed increasing wheel train 3; a generator 5 that is driven by the torque transferred through the speed increasing wheel train 3; a rectifier circuit 6; a power supply circuit 7; a crystal oscillator 8; and a rotation controller 10.

The rotation controller 10 is configured by an IC device manufactured in a SOI (Silicon on Insulator) process, and includes an oscillation circuit 11, a frequency divider 12, a rotation detection circuit 13, a brake control circuit 14, a constant voltage circuit 15, and a temperature compensator 20.

The time display mechanism 4 includes a second hand, minute hand, and hour hand, all not shown in the figures.

Figure 2:
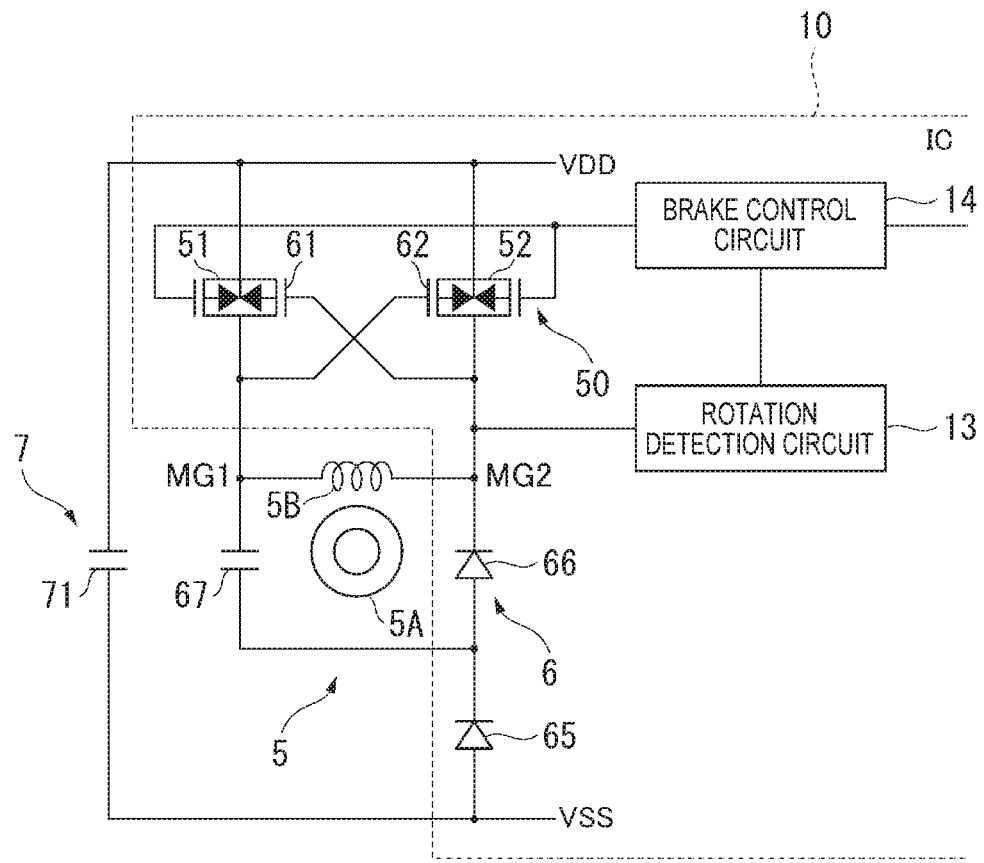
FIG. 2 is a circuit diagram illustrating the configuration of main parts of the electronically controlled mechanical timepiece.

As shown in FIG. 2, the generator 5 includes a rotor 5A, and a coil 5B that produces induced electromotive force in conjunction with rotation of the rotor 5A, and supplies electrical energy. The rotor 5A is driven by the spring 2 through the speed increasing wheel train 3. The rotor 5A is a magnetized rotor with two poles, and part of the rotor 5A is a magnet. As the generator 5 turns, the magnetic flux varies with rotation of the rotor 5A, producing induced electromotive force and generating electrical energy.

A brake circuit 50 that is controlled by the brake control circuit 14, and the rectifier circuit 6, are connected to the first output terminal MG1 and second output terminal MG2 of the coil 5B of the generator 5. As a result, electrical energy supplied from the generator 5 passes through the rectifier circuit 6 and is stored in a power supply capacitor 71 of the power supply circuit 7. The rotation controller 10 is driven by the voltage (generated voltage) produced at the ends of the power supply capacitor 71.

Brake Circuit

The brake circuit 50 brakes the rotation of the rotor 5A, causing the generator 5 to function as a regulator. The brake circuit 50 includes a first chopper transistor 51 connected to the first output terminal MG1 from which an AC signal (alternating current) produced by the generator 5 is output, and a second chopper transistor 52 connected to the second output terminal MG2 from which the AC signal is output. When the chopper transistors 51 and 52 are on, the first output terminal MG1 and second output terminal MG2 are shorted in a closed loop, applying a short brake to the generator 5.

The chopper transistors 51 and 52 are connected to the input terminal side (VDD side) of the power supply circuit 7.

The chopper transistors 51 and 52 are configured by p-channel field-effect transistors (FET). The brake control signal from the brake control circuit 14 is input to the gates of the chopper transistors 51 and 52. As a result, the chopper transistors 51 and 52 are held on while the brake control signal is Low. While the brake control signal is High, the chopper transistors 51 and 52 are off, and braking is not applied to the generator 5. In other words, the chopper transistors 51 and 52 can be turned on and off, and the generator 5 can be chopper controlled, by controlling the level of the brake control signal.

In this example the brake control signal is a 128 Hz signal, and by changing the duty cycle, the braking force of the generator 5 can be adjusted. More specifically, if the length of time the brake control signal is held Low time in one cycle is long, the chopper transistors 51 and 52 are kept on for a longer time, the duration that a short brake is applied increases, and the braking force increases. Conversely, if the length of time the brake control signal is held Low in one cycle is short, the braking force decreases. The braking force can therefore be adjusted by controlling the duty cycle of the brake control signal.

Rectifier Circuit

The rectifier circuit 6 be configured by a boost rectifier, full-wave rectifier, half-wave rectifier, or transistor rectifier, for example, boosts and rectifies the AC output from the generator 5, and supplies power charging the supply circuit 7. As shown in FIG. 2, the rectifier circuit 6 in this example includes a first rectifier switch 61, a second rectifier switch 62, diode 65, diode 66, and a boost capacitor 67.

The first rectifier switch 61 is configured by a first rectification transistor connected parallel to the first chopper transistor 51 of the brake circuit 50 with the gate connected to the second output terminal MG2.

Likewise, the second rectifier switch 62 is configured by a second rectification transistor connected parallel to the second chopper transistor 52 and the gate connected to the first output terminal MG1. The rectification transistors are configured by p-channel field-effect transistors (FET).

The diodes 65 and 66 are unidirectional elements that pass current in one direction, and are not limited to any specific type.

Because the electromotive force of the generator 5 in the electronically controlled mechanical timepiece 1 is small, the diodes 65 and 66 are preferably Schottky-barrier diodes or silicon diodes with low voltage drop and reverse leakage current.

Note that in this embodiment, as shown in FIG. 2, the first chopper transistor 51, second chopper transistor 52, first rectifier switch 61, second rectifier switch 62, diode 65, and diode 66 are configured in an IC device with the rotation controller 10, and the rotor 5A and coil 5B of the generator 5, the boost capacitor 67, and the power supply capacitor 71 are disposed externally to the IC device. By configuring part of the rectifier circuit 6 inside the IC device, there are fewer elements to mount on a circuit board inside the electronically controlled mechanical timepiece 1, and cost can be effectively reduced. Leakage current can also be reduced by using an IC device manufactured in an low leakage current IC manufacturing process.

Note that the capacity, that is, the size, of the chopper transistors 51 and 52 can be set based on the chopper current in the generator 5.

By including a boost capacitor 67, the rectifier circuit 6 also charges the power supply capacitor 71 using the charge stored in the boost capacitor 67 in the charging process. As a result, a higher voltage can be applied to the IC embodying the rotation controller 10, and stable IC operation can be assured.

Note that the rectifier circuit 6 in FIG. 2 is a two-stage boost rectifier circuit, but additional diodes and capacitors may be used to provide three, four, or more boost stages, and further increase the voltage of the power supply capacitor 71.

Configuration of the Rotation Controller

The configuration of the rotation controller 10 that controls rotation of the rotor 5A of the generator 5 is described next with reference to FIG. 1.

The oscillation circuit 11 drives when the voltage of the power supply capacitor 71 increases, and causes the crystal oscillator 8, which is an oscillating signal generator, to oscillate. The oscillating signal (32768 Hz) from the crystal oscillator 8 is output to a flip-flop frequency divider 12.

Figure 3:
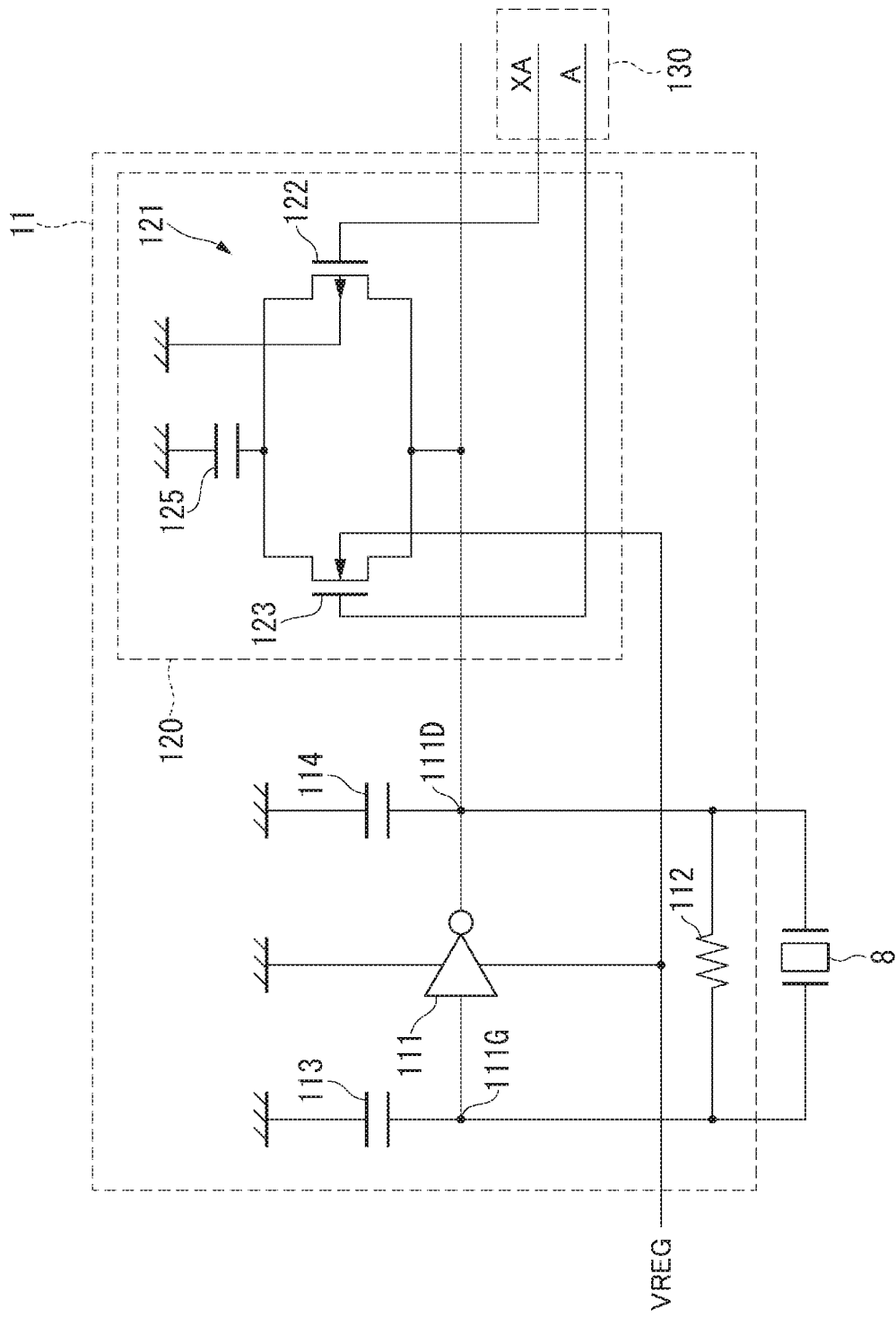
FIG. 3 is a circuit diagram illustrating the configuration of the oscillation circuit of the electronically controlled mechanical timepiece.

FIG. 3 is a circuit diagram of one example of an oscillation circuit 11 with additional capacitance for frequency adjustment. The oscillation circuit 11 is a common circuit for driving the crystal oscillator 8 to oscillate, and includes an oscillation inverter 111, a feedback resistor 112, a gate capacitor 113 connected to the gate 111G of the oscillation inverter 111, a drain capacitor 114 connected to the drain 111D of the oscillation inverter 111, and a frequency adjuster 120.

The frequency adjuster 120 is configured by a transmission gate 121, and an adjustment capacitance (capacitor) 125 connected in series with the transmission gate 121. The transmission gate 121 is a switch that can connect and disconnect the adjustment capacitance 125 from the drain 111D of the oscillation inverter 111. All signals applied to the gate of the switching transmission gate 121 and the substrate are constant voltage signals.

The transmission gate 121 is configured by two field-effect transistors 122, 123 connected in parallel. Of high potential constant voltage VDD and a low potential constant voltage VREG output from the constant voltage circuit 15, the high potential constant voltage VDD is connected (supplied) to the substrate of the p-channel field-effect transistor 122. A first control signal XA adjusted to a constant voltage by a level shifter 130 is input to the gate of the field-effect transistor 122.

The low potential constant voltage VREG is connected to the substrate of the n-channel field-effect transistor 123, and a second control signal A adjusted to a constant voltage by the level shifter 130 is input to the gate.

The level shifter 130 is a circuit that adjusts control signals output from a frequency adjustment control circuit 37 described below to a constant voltage, and inputs to the frequency adjuster 120. Note that the first control signal XA is the second control signal A inverted.

The control signal output from the frequency adjustment control circuit 37 controls changing the ratio of the time the adjustment capacitance (capacitor) 125 connects to and does not connect to the drain 111D during a specific period (such as 10 seconds). As a result, the frequency adjuster 120 can precisely adjust the average frequency of the oscillation signal output from the oscillation circuit 11 during this specific period. In addition, the frequency can be adjusted by a single adjustment capacitance (capacitor) 125 when there is not enough space to provide multiple adjustment capacitances (capacitors) 125.

Note that the oscillation circuit 11 is not limited to the circuit shown in FIG. 3. For example, the frequency of the oscillation signal can be adjusted even more precisely by providing multiple frequency adjusters 120 and changing the number of adjustment capacitances (capacitors) 125 that connect to the drains 111D.

The frequency divider 12 frequency divides the oscillation signal, produces clock signals at multiple frequencies (such as 2 kHz-8 Hz), and outputs the necessary clock signals to the brake control circuit 14 and temperature compensator 20. As described below, the clock signal output from the frequency divider 12 to the brake control circuit 14 is a reference signal fs1 used as the reference for rotation control of the rotor 5A.

The rotation detection circuit 13 is configured by a waveform shaping circuit and monostable multivibrator (not shown in the figure) connected to the generator 5, and outputs a rotation detection signal FG1 representing the rotational frequency of the rotor 5A of the generator 5.

The brake control circuit 14 compares the rotation detection signal FG1 output from the rotation detection circuit 13 with the reference signal fs1 output from the frequency divider 12, and outputs a brake control signal to the brake circuit 50 to regulate the generator 5.

Note that the reference signal fs1 is a signal corresponding to the reference rotational speed (8 Hz in this example) of the rotor 5A during normal operation of the movement. Therefore, the brake control circuit 14 changes the duty cycle of the brake control signal according to the difference between the speed of rotor 5A rotation (rotation detection signal FG1) and the reference signal fs1, controlling the on time of the chopper transistors 51 and 52 of the brake circuit 50 and adjusting the brake force to control operation of the rotor 5A.

The constant voltage circuit 15 converts an external voltage supplied from the power supply circuit 7 to a constant voltage supplied to the temperature compensator 20. The circuits driven by the constant voltage circuit 15 are described below.

Temperature Compensator

The temperature compensator 20 compensates for the thermal characteristics of the crystal oscillator 8 to suppress variation in the oscillation frequency, and includes a temperature compensation function control circuit 21, and a temperature compensation circuit 30.

The temperature compensation function control circuit 21 operates the temperature compensation circuit 30 at a specific timing.

The temperature compensation circuit 30 includes a temperature sensor 31, which is a temperature measuring device, a temperature compensation table storage 32, a device-difference compensation data storage 33, an arithmetic circuit 35, theoretical regulation circuit 36, and a frequency adjustment control circuit 37.

As shown in FIG. 1, the circuits in the rotation controller 10 that are driven by the constant voltage circuit 15 are the circuits other than the interface to external devices (rotation detection circuit 13), temperature compensation table storage 32, and device-difference compensation data storage 33.

More specifically, the constant voltage circuit 15 drives the oscillation circuit 11, frequency divider 12, brake control circuit 14, temperature compensation function control circuit 21, temperature sensor 31, arithmetic circuit 35, theoretical regulation circuit 36, and frequency adjustment control circuit 37 by a constant voltage. The temperature compensation table storage 32 and device-difference compensation data storage 33 are driven by the power supply circuit 7, and not by the constant voltage circuit 15.

The temperature sensor 31 inputs to the arithmetic circuit 35 output corresponding to the temperature of the environment where the electronically controlled mechanical timepiece 1 is being used. Devices using diodes, or devices using an RC oscillator circuit, may be used s the temperature sensor 31, and the current temperature is detected by the output signal that changes according to the thermal characteristic of the diode or RC oscillator circuit. In this embodiment of the invention, the temperature sensor 31 is an RC oscillator circuit configured to produce an output signal that, after wave shaping, can be quickly processed by digital signal processing.

More specifically, the frequency of the signal output from the RC oscillator circuit changes according to the environmental temperature, and the temperature can be detected from the frequency of the output signal. In addition, if the RC oscillator circuit is configured to be driven by a constant current, the drive current of the temperature sensor 31 is determined by the constant current setting, the current setting can be controlled by design, and a low current consumption design can be easily achieved. Because a constant current driven RC oscillator circuit can be driven with a low voltage and low current consumption, it is well suited as a temperature sensor 31 in an electronically controlled mechanical timepiece 1 having a temperature compensation capability.

Figure 4:
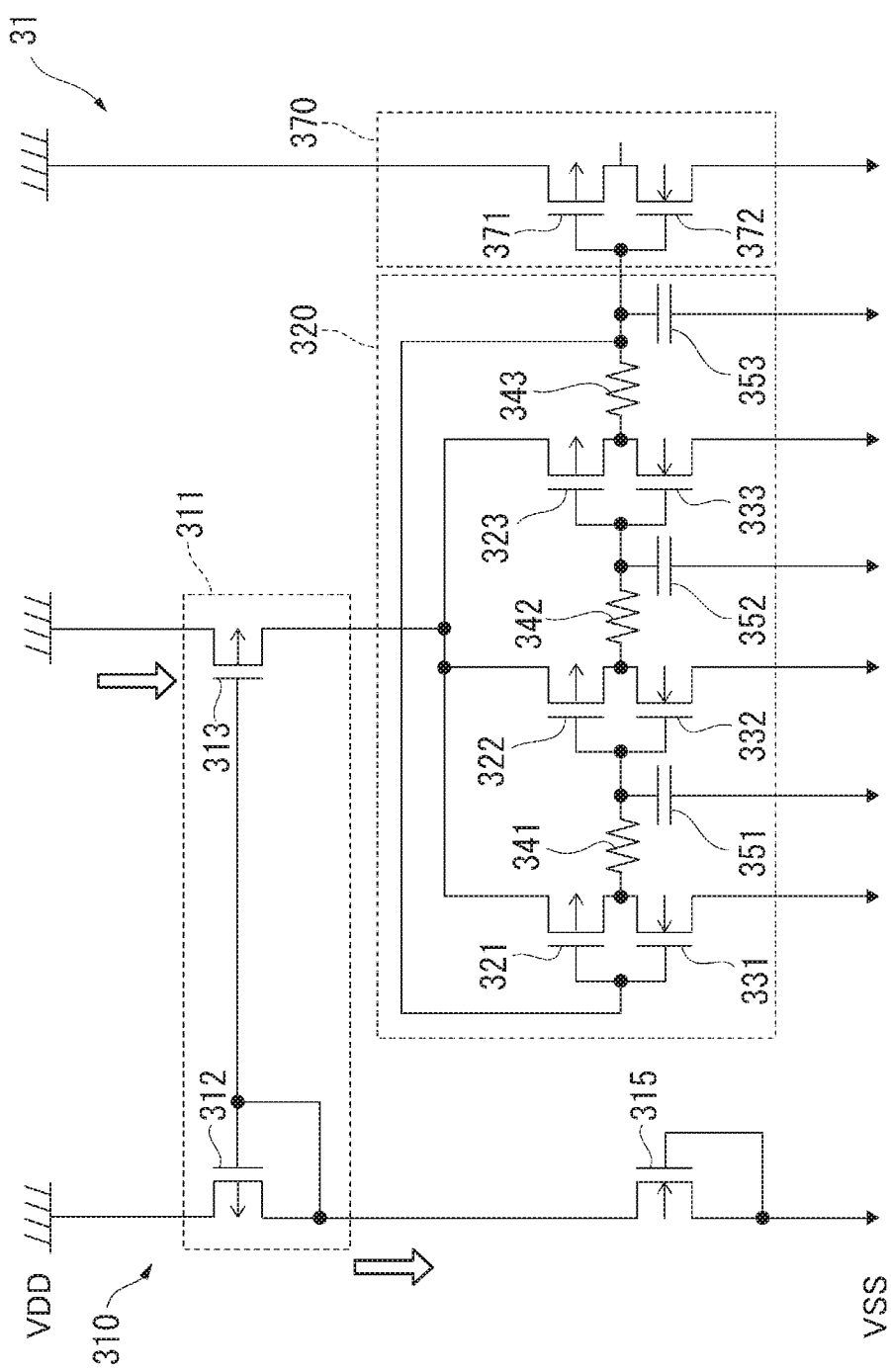
FIG. 4 is a circuit diagram illustrating the configuration of the temperature sensor of the electronically controlled mechanical timepiece.

An example of a temperature sensor 31 using a RC oscillator circuit is shown in FIG. 4. The temperature sensor 31 includes a constant current circuit 310, a RC oscillator circuit 320, and an output buffer 370.

The constant current circuit 310 includes a current trimmer 311, and a constant current source 315.

The current trimmer 311 is a common circuit configured with first and second p-channel field-effect transistors 312 and 313. The constant current source 315 is a common constant current source configured using a depletion transistor. As a result, the constant current circuit 310 supplies a constant current to the RC oscillator circuit 320.

The RC oscillator circuit 320 is a circuit configured with a network of capacitors (C) and resistors (R), and outputs an oscillation signal of a previously set frequency. The RC oscillator circuit 320 in this example is a common RC oscillator circuit with three inverter stages. The inverters stages are configured with a p-channel field-effect transistor 321 to 323, and an n-channel field-effect transistor 331 to 333. Resistors 341 to 343 and capacitors 351 to 353 are connected in series with the inverters.

The output buffer 370 is an inverter configured with a p-channel field-effect transistor 371 and an n-channel field-effect transistor 372.

Output from the 371 is the output of the oscillation signal produced by the RC oscillator circuit 320, and is input to the arithmetic circuit 35 as the output of the temperature sensor 31.

The frequency of the oscillation signal from the RC oscillator circuit 320 is determined by the charge-discharge rate of the charge charged to the capacitors 351 to 353. The oscillation frequency is therefore determined by the values of the resistors (discharge resistors) 341 to 343 and the capacitors 351 to 353, and the constant current supplied from the constant current circuit 310. Because the resistors 341 to 343, capacitors 351 to 353, and other elements configuring the RC oscillator circuit 320 have a thermal characteristic, the frequency of the oscillation signal output from the RC oscillator circuit 320 changes with the temperature. A temperature sensor 31 comprising a RC oscillator circuit 320 can be configured by using this thermal characteristic.

The temperature compensation table storage 32 stores a temperature compensation data table setting how much the rate should be adjusted at a particular temperature assuming an ideal crystal oscillator 8 and an ideal temperature sensor 31.

However, because individual differences occur in the crystal oscillator 8 and temperature sensor 31 during the manufacturing process, device-difference compensation data setting how much the device difference should be corrected based on the characteristics of the specific crystal oscillator 8 and the characteristics of the specific temperature sensor 31 measured during manufacturing and inspection processes is stored in the device-difference compensation data storage 33.

Mask ROM is used for the temperature compensation table storage 32 in this example. Mask ROM is used because it is the simplest type of semiconductor memory, has a high degree of integration, and occupies a small area.

The device-difference compensation data storage 33 is nonvolatile memory, and is preferably FAMOS memory. This is because current (leakage current) is low after FAMOS memory is written, and FAMOS memory can be written with relatively low voltage compared with other types of nonvolatile memory.

Note that EEPROM or other rewritable types of nonvolatile memory are normally used as the nonvolatile memory for the device-difference compensation data storage 33. However, nonvolatile memory such EEPROM requires a relatively high voltage for writing. Because a rotation controller (IC) 10 manufactured in a SOI process has a low breakdown voltage, if a high voltage is used to write data, the IC may fail when writing data.

Using FAMOS memory for the nonvolatile memory storing device-difference compensation data is therefore necessary when using a rotation controller 10 manufactured in an SOI process. Because a low voltage is used to write to FAMOS, device failure resulting from exceeding the breakdown voltage can be prevented even in a low breakdown voltage SOI process, and data can be stored in an IC manufactured in an SOI process. Operating with a low voltage and low leakage, which are characteristics of the SOI process, is also possible.

Figure 5:
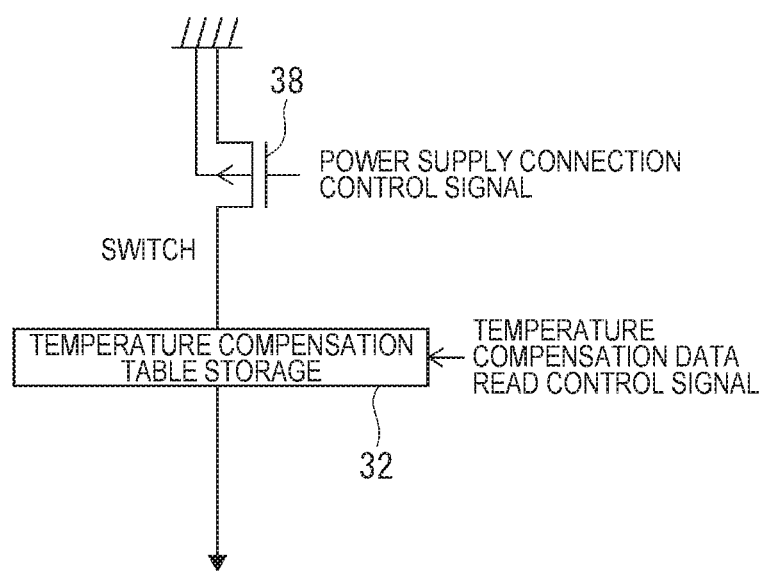
FIG. 5 shows the temperature compensation table storage and a first switch.
Figure 6:
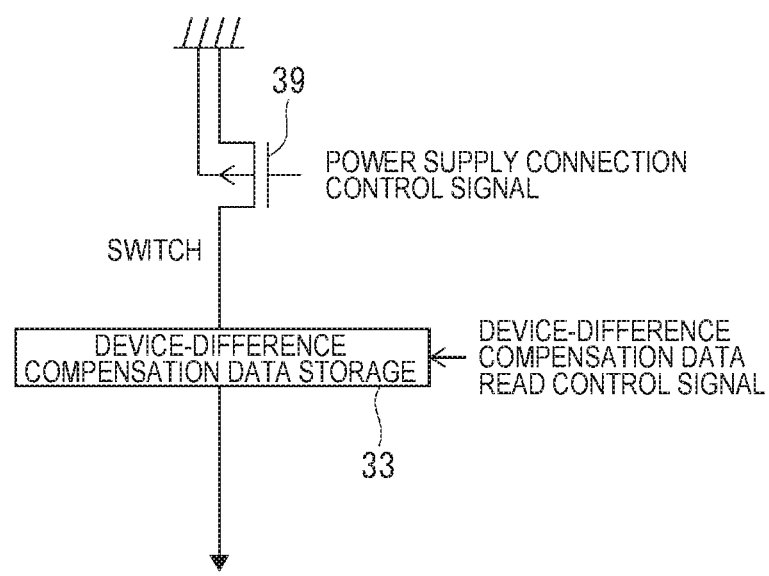
FIG. 6 shows the device-difference compensation data storage and a second switch.

As shown in FIG. 5 and FIG. 6, the temperature compensation table storage 32 and device-difference compensation data storage 33 are connected to the power supply circuit 7 through a first switch 38 and a second switch 39. The first switch 38 and second switch 39 are also configured by field-effect transistors.

First switch 38 and second switch 39 are controlled on/off by a power supply connection control signal output from the temperature compensation function control circuit 21. The first switch 38 and second switch 39 can therefore be easily connected to and disconnected from the power supply circuit 7 by the power supply connection control signal, and the OFF-state leakage current can be reduced.

The temperature compensation table storage 32 and device-difference compensation data storage 33 are driven by the power supply circuit 7 and not by the constant voltage circuit 15 for the reasons described below.

Figure 7:
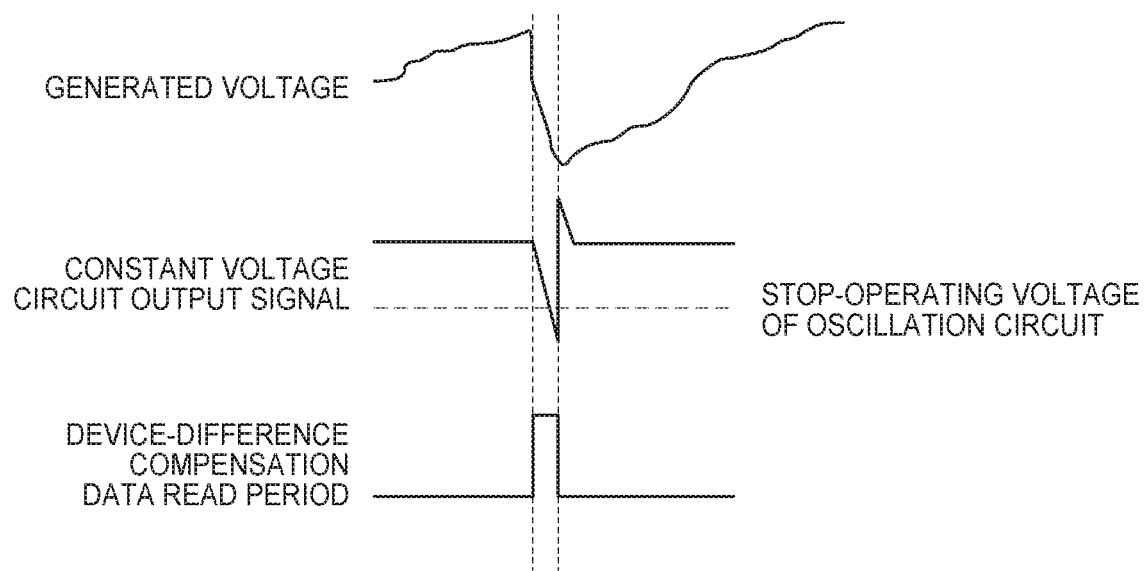
FIG. 7 is a graph of change in the generated voltage when reading the device-difference compensation data and constant voltage circuit output in an example of the related art.

For example, when the device-difference compensation data storage 33 is driven by the constant voltage circuit 15, the constant voltage output drops while reading the device-difference compensation data and may go below the voltage at which the oscillation circuit 11 stops operating (referred to below as the stop-operating voltage), as shown in FIG. 7. The constant voltage output of the constant voltage circuit 15 must therefore be set so that a voltage greater than the stop-operating voltage of the oscillation circuit can be maintained even when there is a voltage drop, and current consumption increases as the constant voltage output increases.

Figure 8:
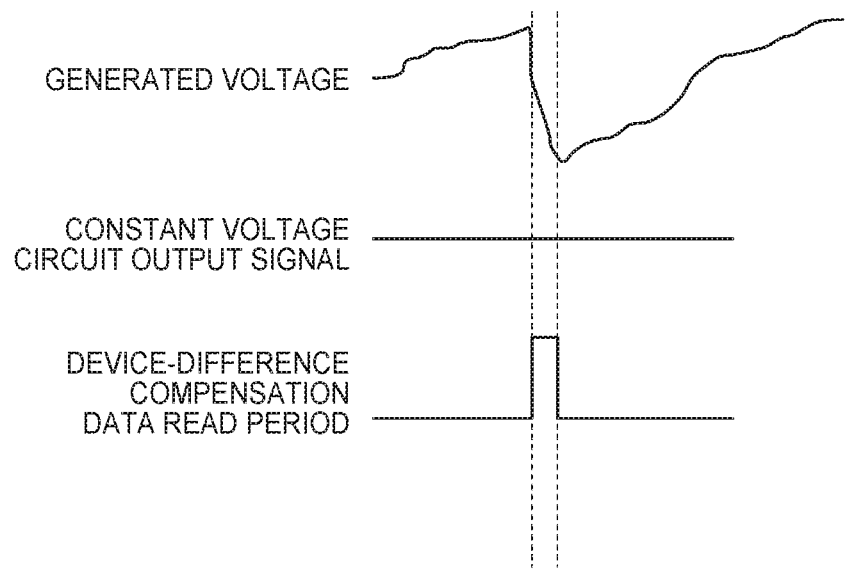
FIG. 8 is a graph of change in the generated voltage when reading the device-difference compensation data and constant voltage circuit output in an embodiment of the invention.

However, when the device-difference compensation data storage 33 is driven by the power supply circuit 7, that is, a power supply other than the constant voltage circuit 15, the output voltage of the power supply circuit 7 drops due to the current load of the device-difference compensation data read process as shown in FIG. 8, but there is no effect on the output of the constant voltage circuit 15. As a result, the constant voltage output of the constant voltage circuit 15 is set as low as possible within the range enabling driving the oscillation circuit 11 and temperature sensor 31, for example, and current consumption can be reduced.

Figure 9:
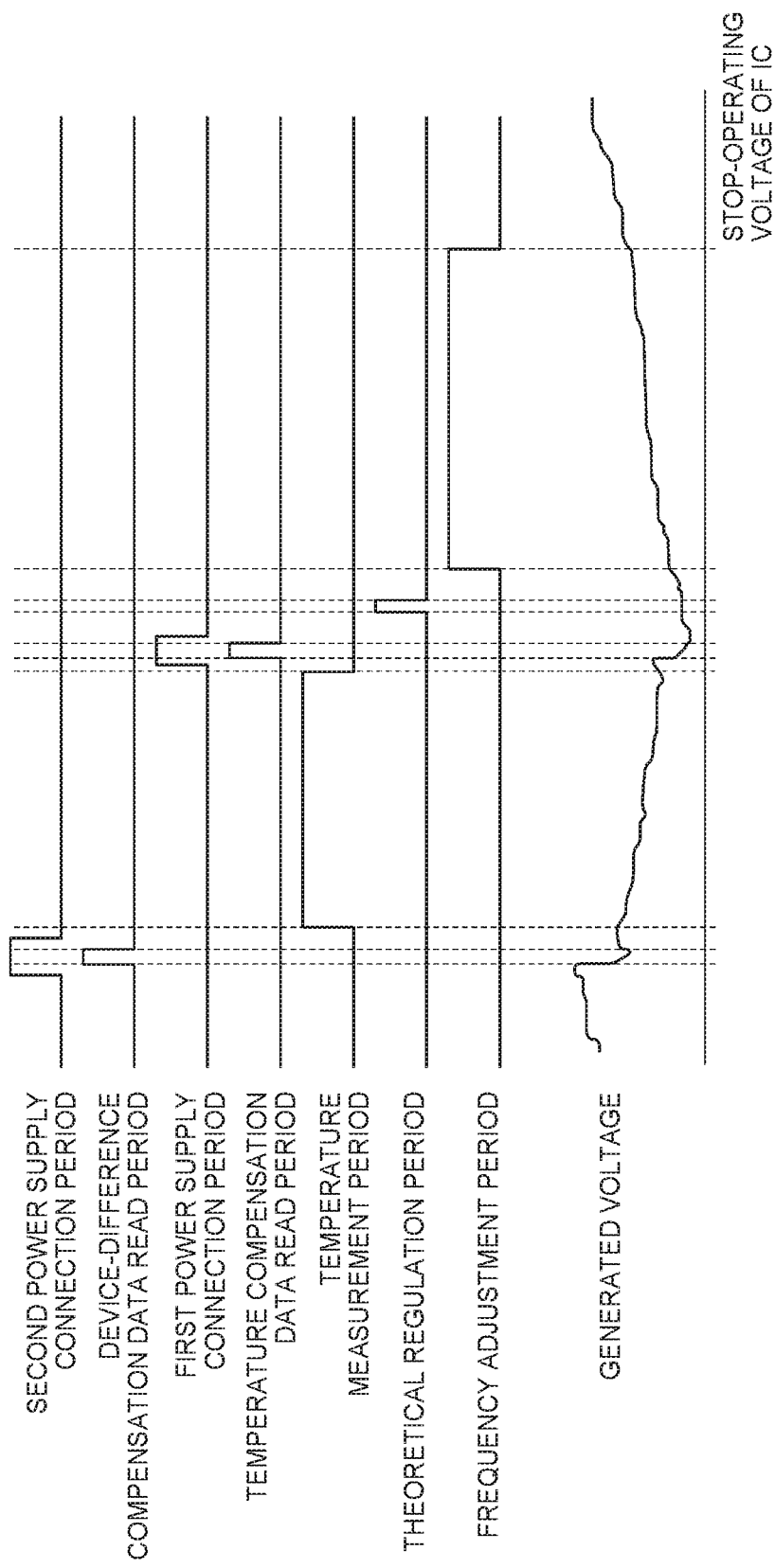
FIG. 9 is a timing chart of processes during rate adjustment in a preferred embodiment of the invention.

As shown in the timing chart in FIG. 9, the second power supply connection period in which the second switch 39 is connected (on) is set to include a rising period until the device-difference compensation data storage 33 operates normally, and a device-difference compensation data reading period in which the arithmetic circuit 35 reads the device-difference compensation data.

Likewise, the first power supply connection period in which the first switch 38 is connected is set to include a rising period until the temperature compensation table storage 32 operates normally, and a temperature compensation data reading period in which the temperature compensation data is read.

Figure 10:
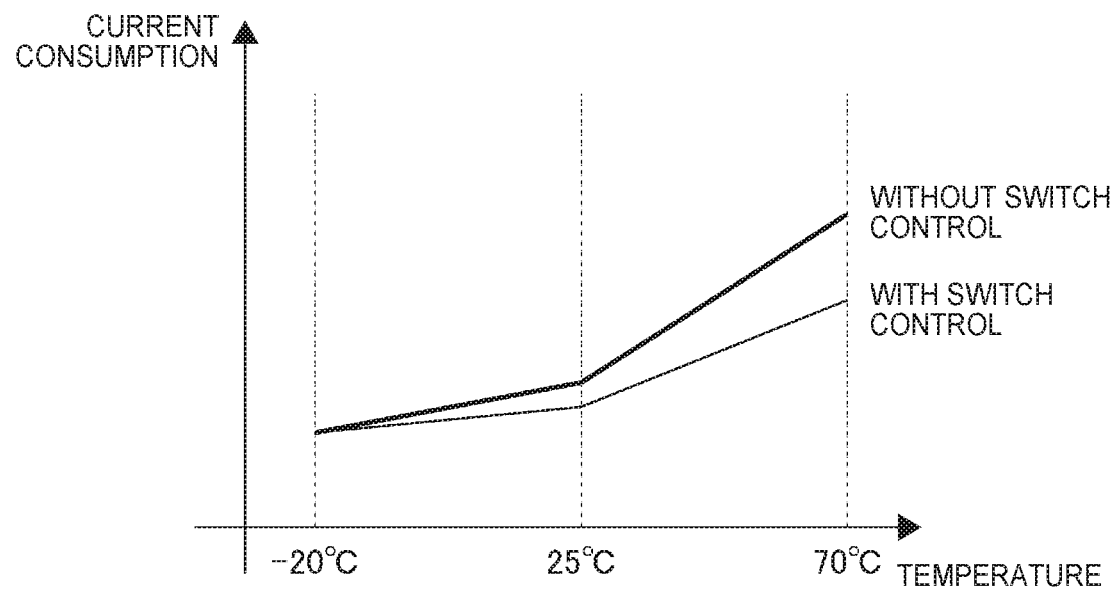
FIG. 10 is a graph of change in current consumption with and without controlling the first switch and second switch.

FIG. 10 is a graph showing change in the current consumption with and without switching control of the first switch 38 and second switch 39.

Compared with the temperature compensation table storage 32 and device-difference compensation data storage 33 being connected to the power supply circuit 7 without switching control, leakage current when the temperature compensation table storage 32 and device-difference compensation data storage 33 are not operating can be reduced with switching control, and the current consumption of the IC can be reduced. More particularly, because leakage current increases exponentially when the temperature is high, the effect on current consumption is extremely great, and when switching control is used, current consumption can be greatly reduced compared with when there is no switching control.

Figure 11:
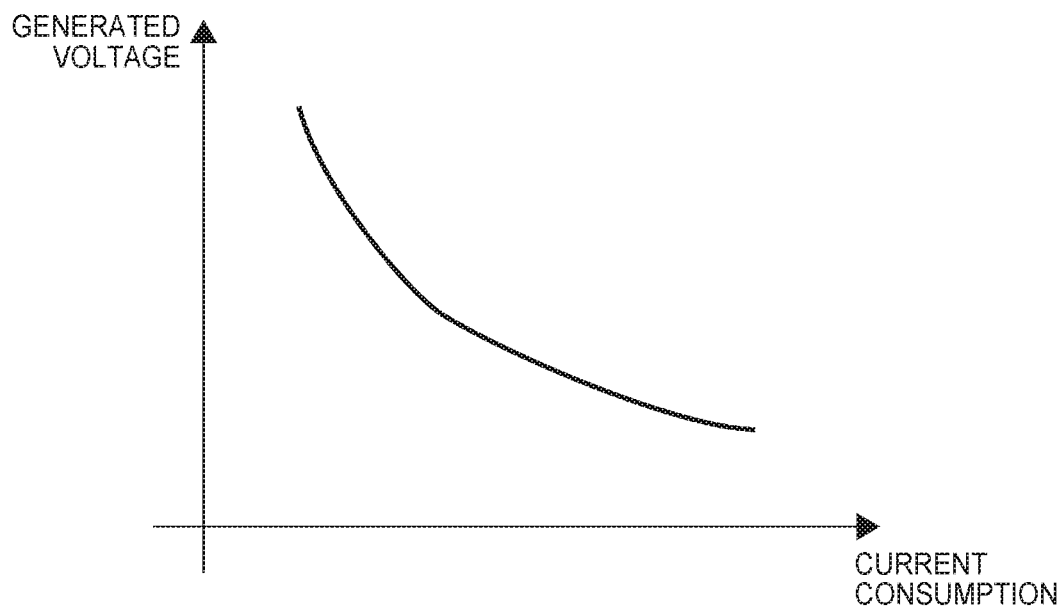
FIG. 11 is a graph of the correlation between output voltage and current consumption when a constant mechanical energy is applied to the generator.

FIG. 11 shows the correlation between current consumption and generated voltage when constant mechanical energy is applied to the generator 5. As current consumption increases, the generated voltage decreases, and as current consumption decreases, the generated voltage increases. Therefore, when current consumption is low, generated voltage sufficient to drive the IC can be produced even when mechanical energy decreases, and autonomy can be increased.

The arithmetic circuit 35 calculates the compensation of the rate using the output (temperature) from the temperature sensor 31, the temperature compensation data table stored in the temperature compensation table storage 32, and the device-difference compensation data stored in the device-difference compensation data storage 33, and outputs the result to the theoretical regulation circuit 36 and frequency adjustment control circuit 37.

This embodiment of the invention adjusts the rate by two methods using the theoretical regulation circuit 36 and frequency adjustment control circuit 37.

The theoretical regulation circuit 36 is a circuit enabling digitally increasing and decreasing the period of the clock signal by inputting a set or reset signal at a specific timing to each frequency dividing stage of the frequency divider 12. For example, if the period of the clock signal is shortened approximately 30.5 μsec (1/32768 Hz) once in 10 seconds, the clock signal period can be shortened 8640 times per day, and the signal change becomes 8640×30.5 μsec=0.264 sec faster. In other words, the time is advanced each day 0.264 sec/day. Note that sec/day (s/d) is the rate, and indicates the time shift per day.

Figure 12:
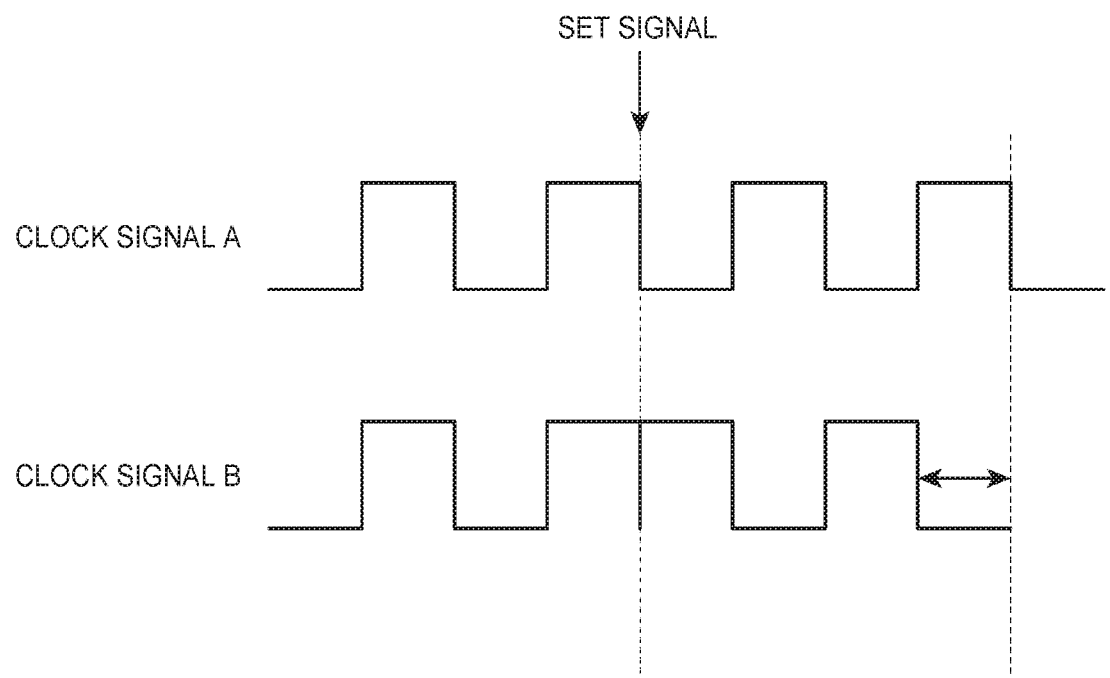
FIG. 12 shows the concept of theoretical regulation.

For example, as shown in FIG. 12, if the theoretical regulation circuit 36 inputs a set signal to a frequency division stage of the frequency divider 12 timed to the falling edge of clock signal A before regulation, clock signal B after regulation becomes a half period faster, and the time can be advanced a half period.

Figure 13:
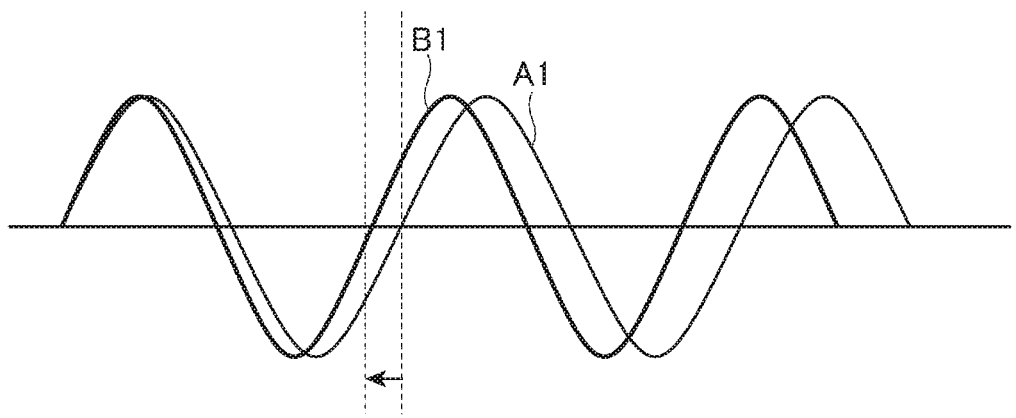
FIG. 13 shows the concept of frequency adjustment.

As described above, the frequency adjustment control circuit 37 is a circuit that adjusts the oscillation frequency of the oscillation circuit 11 by adjusting the additional capacitance of the oscillation circuit 11. Because the oscillation frequency decreases when the additional capacitance increases, the oscillation circuit 11 can delay the time. Conversely, when the additional capacitance decreases, the oscillation frequency increases, and the oscillation circuit 11 can advance the time. For example, as shown in FIG. 13, when the additional capacitance decreases, the oscillation frequency of clock signal B1 becomes greater and the period becomes shorter than the clock signal A1 before adjustment, and the time can therefore be advanced. The rate can therefore be finely adjusted compared with the theoretical regulation by adjusting the ratio of the time additional capacitance is added or not added during a previously set specific period (such as 10 sec).

For example, if the oscillation circuit 11 configured as shown in FIG. 3 is controlled to connect additional capacitance for frequency adjustment to the drain 111D for 9.9 sec of the correction timing period (10 sec) of theoretical regulation, the rate at that time is 0.1 sec/day and the additional capacitance for frequency adjustment is disconnected from the drain 111D for 0.1 sec, and the rate at that time is 1 sec/day, the average rate in the 10 sec period will be 0.109 sec/day. Therefore, the time can be adjusted 0.109 sec/day−0.1 sec/day=0.009 sec/day, and can be adjusted with greater precision than theoretical regulation with an adjustment of 0.264 sec/day.

Note that the theoretical regulation circuit 36 can adjust the rate more precisely by increasing the period of the theoretical regulation timing. For example, if adjustment is changed from once every 10 sec to once every 20 sec, the number of theoretical regulations per day is halved, and the amount of adjustment is also halved. However, because the gate time of rate testers used by most retailers is usually set to 10 seconds, most retailers and service shops are unable to accurately measure the rate if the theoretical regulation period is longer than 10 seconds, and after-sales service becomes a problem.

In addition, extremely large additional capacitance is required for the frequency adjustment control circuit 37 to adjust the rate greatly. Adding a high additional capacitance increases the current consumption required to drive the oscillation circuit 11, and a low current consumption design cannot be achieved.

Therefore, by using the theoretical regulation circuit 36 for rough adjustment, and using capacitance regulation that adjusts the additional capacitance of the oscillation circuit 11 for fine adjustment, this embodiment of the invention enables a low current consumption design that also solves potential after-sales service problems.

The rate adjustment method of the electronically controlled mechanical timepiece 1 according to this embodiment of the invention is described next.

As described above, the frequency-thermal characteristic (thermal characteristic of the rate) of the crystal oscillator 8 of the electronically controlled mechanical timepiece 1 is measured, and device-difference compensation data for the crystal oscillator 8 and temperature sensor 31 are determined and stored in the device-difference compensation data storage 33 during production.

Note that because the thermal characteristic of the rate is for an ideal crystal oscillator 8 and ideal temperature sensor 31, the temperature compensation table storage 32 stores common temperature compensation data for the electronically controlled mechanical timepiece 1.

Rate adjustment of the electronically controlled mechanical timepiece 1 is described next.

When the electronically controlled mechanical timepiece 1 is operating, the temperature compensation function control circuit 21 counts the clock signals output from the frequency divider 12, counts a regular temperature measurement timing, and when the temperature measurement timing is reached, executes the steps of measuring the temperature, operates the temperature sensor 31, and outputs the temperature measured by the temperature sensor 31 to the arithmetic circuit 35.

The arithmetic circuit 35 reads data from the temperature compensation table storage 32 and device-difference compensation data storage 33, and using the read data corrects the output value of the temperature sensor 31. The data read periods and the temperature measurement period are set to not overlap. More specifically, as shown in FIG. 9, when the steps of measuring the temperature are executed, the arithmetic circuit 35 sets the second switch 39 to the connected state, and reads device-difference compensation data from the device-difference compensation data storage 33. Once reading the device-difference compensation data is completed, the arithmetic circuit 35 turns the second switch 39 to the disconnected state, and measures the temperature with the temperature sensor 31.

When the temperature measurement period ends, the arithmetic circuit 35 sets the first switch 38 to the connected state, and reads the temperature compensation data from the temperature compensation table storage 32. When the temperature compensation data reading period ends, the arithmetic circuit 35 sets the first switch 38 to the disconnected state.

Note that the period of the temperature measurement timing may be the same as the period of the rate adjustment timing of the theoretical regulation circuit 36 and frequency adjustment control circuit 37, but because a temperature change does not occur in such a short period, the period of the temperature measurement timing is preferably longer than the rate adjustment timing. Because the voltage of the generated voltage drops due to the current load when the temperature is measured frequently, the temperature is preferably measured at a longer period than the rate adjustment timing (such as a 160 second period).

The arithmetic circuit 35 executes the step of calculating the correction for temperature compensation, and calculates the rate compensation based on the temperature measured at the temperature measurement timing (160 sec), and the data stored in the temperature compensation table storage 32 and device-difference compensation data storage 33.

Figure 14:
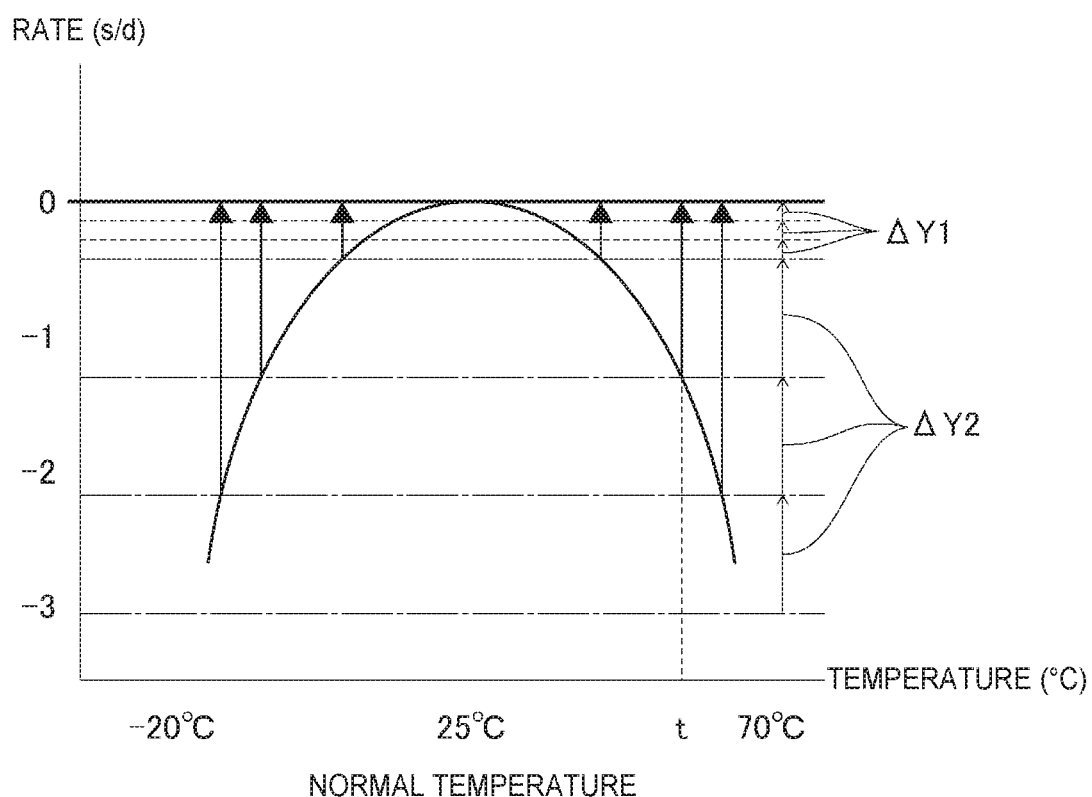
FIG. 14 is a graph showing the thermal characteristic of the oscillation frequency of the crystal oscillator, and compensation based on theoretical regulation and frequency adjustment.

Suppose, for example, that the thermal characteristic of the oscillation frequency of the crystal oscillator 8 is as shown in FIG. 14, the rate at 25° C. is 0 (s/d), and the rate ranges from 0 to −3 (s/d) according to the temperature at temperatures lower than 25° C. and temperatures greater than 25° C.

In this example, the arithmetic circuit 35 calculates the compensation required to set the rate to 0 (s/d). When the rate compensation timing comes (at a 10 sec interval in this example), the arithmetic circuit 35 inputs the compensation amount to the theoretical regulation circuit 36 and frequency adjustment control circuit 37 according to the calculated correction, and executes a step of controlling the oscillation circuit 11 and a step of controlling the frequency divider 12.

For example, if the measured temperature is near 25° C., compensation may be possible using only the frequency adjustment control circuit 37. In this case, the arithmetic circuit 35 inputs a correction amount of 0 (compensation not needed) to the theoretical regulation circuit 36, and inputs the amount of rate compensation to the frequency adjustment control circuit 37. If the measured temperature deviates greatly from 25° C., such as being −10° C. or +40° C., for example, compensation amounts are input to the theoretical regulation circuit 36 to make a coarse adjustment, and to the frequency adjustment control circuit 37 to then make a fine adjustment.

For example, in FIG. 14, if $\Delta Y1$ is the amount of compensation the frequency adjustment control circuit 37 can adjust, and $\Delta Y2$ is the amount of compensation the theoretical regulation circuit 36 can adjust, at temperature t (° C.), the rate is adjusted by one coarse adjustment step ($\Delta Y2 \times 1$) by theoretical regulation, and three fine adjustment steps ($\Delta Y1 \times 3$) by frequency adjustment. In a oscillation circuit 11 using a 32 kHz crystal oscillator 8 as the oscillation source, the smallest possible digital adjustment of the clock signal period is approximately 30 μsec. If theoretical regulation executes once every 10 sec, there are 8640 corrections per day, enabling a maximum adjustment of approximately 0.264 sec/day. The arithmetic circuit 35 calculates and controls how many steps to execute.

Frequency adjustment enables adjusting the rate in smaller increments by adjusting the ratio of the time additional capacitance is added or not added during the compensation timing interval (10 sec) of theoretical regulation.

As shown in FIG. 9, the voltage of the power supply circuit 7 drops in the temperature compensation data read period, the device-difference compensation data read period, and the operating period of the temperature sensor due to the data reading operations and temperature measurement operations. Therefore, by controlling operation so these periods do not overlap, the current load can be dispersed, and the voltage drop of the generated voltage in the power supply circuit 7 can be reduced.

The theoretical regulation circuit 36 outputs to the frequency divider 12 a theoretical regulation signal corresponding to the amount of compensation input from the arithmetic circuit 35, and adjusts the rate by changing the timing of the clock of the frequency divider 12 at the compensation timing (such as every 10 sec) of theoretical regulation.

The frequency adjustment control circuit 37 adjusts the additional capacitance of the oscillation circuit 11 according to the compensation input from the arithmetic circuit 35, and adjusts the oscillation frequency. For example, the frequency adjustment control circuit 37 adjusts the ratio of the time additional capacitance is added and not added between the compensation timing interval (a 10 sec interval) of theoretical regulation, and thereby can adjust the rate in smaller amounts than theoretical regulation.

By setting rate compensation based on the temperature measured at a temperature measurement timing interval (160 sec), and operating the theoretical regulation circuit 36 and frequency adjustment control circuit 37 based on the calculated compensation, the electronically controlled mechanical timepiece 1 can improve the precision of the reference signal fs1 output from the frequency divider 12.

The brake control circuit 14 controls braking so that the frequency (period) of the rotation detection signal FG1 detected by the rotation detection circuit 13 matches the reference signal fs1 output from the frequency divider 12.

As a result, if the precision of the reference signal fs1 output from the frequency divider 12 is great, the precision of the rotational speed of the rotor 5A also increases. The rotor 5A is connected to a speed increasing wheel train 3, and if the precision of the rotational speed of the rotor 5A increases, the hands of the time display mechanism 4 that is connected to the speed increasing wheel train 3 and displays the time can also indicate a more accurate time.

Therefore, while the electronically controlled mechanical timepiece 1 has a spring 2 as the drive source, a high precision electronically controlled mechanical timepiece 1 with accuracy measured in seconds per year can be provided.

Effect of Embodiment 1

Because this embodiment of the invention has a temperature compensator 20 that compensates for the thermal characteristics of the crystal oscillator 8, the precision of the reference signal fs1 output from the frequency divider 12 can be increased even when the temperature of the environment in which the electronically controlled mechanical timepiece 1 is used deviates from the reference temperature (25° C.). As a result, the accuracy of the rotational speed of the rotor 5A can be improved by the brake control circuit 14, and the accuracy of the time displayed by the time display mechanism 4 can be improved. Therefore, a high precision, annual rate electronically controlled mechanical timepiece 1 with accuracy measured in seconds per year can be provided.

Because rewriting the temperature compensation table storage 32 is not necessary, the temperature compensation table storage 32 can be configured using mask ROM, and because rewritable nonvolatile memory is only used to for the device-difference compensation data storage 33, compensation data can be efficiently stored and the area occupied in the IC chip an be reduced. By reducing the size of the device-difference compensation data storage 33, operating current and leakage current when not operation can also be reduced.

The temperature compensation table storage 32 and device-difference compensation data storage 33 can be connected by an intervening first switch 38 and second switch 39 to the power supply circuit 7 only when reading compensation data, can be disconnected from the power supply circuit 7 at other times, and leakage current when not operating can thereby be reduced. As a result, the current consumption of the rotation controller 10 is low, voltage sufficient to drive the IC can be produced even when the mechanical energy supplied from the spring is low, and the autonomy of the electronically controlled mechanical timepiece 1 can be improved.

Because the temperature compensator 20 includes a theoretical regulation circuit 36 and frequency adjustment control circuit 37, a temperature compensation function enabling precise frequency control with low current consumption can be achieved, signal precision can be improved, and power consumption can be reduced. More specifically, considering the gate time of typical testers used for rate adjustment, fine adjustment is not possible using only the theoretical regulation circuit 36 for adjustment. In addition, when using only the frequency adjustment control circuit 37 for adjustment, fine adjustments are possible by increasing the additional capacitance, but current consumption increases from driving the oscillation circuit 11.

Furthermore, a temperature compensation function can be providing by a twin quartz movement using two crystal oscillators, or by using a high oscillation frequency crystal oscillator, but production yield is poor, a low power design is difficult to achieve, and such methods cannot be used in an electronically controlled mechanical timepiece 1.

However, by using both a theoretical regulation circuit 36 and frequency adjustment control circuit 37, and performing coarse adjustments with the theoretical regulation circuit 36 and fine adjustments with the frequency adjustment control circuit 37, the precision of the reference signal fs1 can be improved and current consumption can be suppressed, creating an ideal configuration as a temperature compensator 20 for an electronically controlled mechanical timepiece 1.

By providing a constant voltage circuit 15 in the rotation controller 10, circuits in the rotation controller 10 can be driven by a constant voltage with little voltage variation, and current consumption can be reduced. Therefore, voltage sufficient to drive the rotation controller 10 can be produced even when the mechanical energy supplied from the spring is low, and the autonomy of the electronically controlled mechanical timepiece 1 can be improved.

By driving the temperature sensor 31 and oscillation circuit 11 by a constant voltage, variation in the output signals due to voltage variation can be reduced, and a drop in accuracy due to voltage variations can be prevented.

Furthermore, because the temperature compensation table storage 32 and device-difference compensation data storage 33 are not driven by the constant voltage circuit 15 that drives the temperature sensor 31 and oscillation circuit 11, variation in the constant voltage due to current loads when the temperature compensation table storage 32 and device-difference compensation data storage 33 operate are eliminated, the constant voltage can be set low, and current consumption can be reduced. As a result, an ideal configuration fora high precision electronically controlled mechanical timepiece 1 can be provided.

Furthermore, because the temperature measurement period when the temperature sensor 31 operates, the temperature compensation data read period when data is read from the temperature compensation table storage 32, and the device-difference compensation data read period when data is read from the device-difference compensation data storage 33, and are set to different times and controlled so the periods do not overlap, the current load can be dispersed, and a voltage drop in the power supply circuit 7 below the stop-operating voltage of the IC can be prevented. As a result, even when the mechanical energy from the spring is weak, and generated voltage at the ends of the power supply circuit 7 is low, the generated voltage will not go below the stop-operating voltage of the IC, accurate regulation is possible, and the autonomy of the electronically controlled mechanical timepiece 1 can be increased.

Because the rotation controller 10 is configured with an SOI process IC, the circuits in the IC can be driven with low voltage, and current consumption can be reduced. In addition, because the device-difference compensation data storage 33 is configured with a FAMOS, the FAMOS can be written when the device-difference compensation data storage 33 is configured in an SOI process IC with a low breakdown voltage, and applying a voltage exceeding the breakdown voltage of the IC can be prevented. A rotation controller 10 with low leakage current, capable of low voltage drive, and having a temperature compensation function can therefore be configured by an SOI process, the rotation controller 10 can be driven even when the mechanical energy acquired from the spring is low, and the autonomy of the electronically controlled mechanical timepiece 1 can be improved.

Because a temperature compensation data table is stored in a temperature compensation table storage 32 made of mask ROM, and the device-difference compensation data is stored in a device-difference compensation data storage 33 configured with nonvolatile memory that is rewritable by applying voltage, the area of the storage occupied in the IC is small.

More specifically, because mask ROM is the simplest type of semiconductor memory configuration and has a high degree of integration, the temperature compensation table storage 32 can be configured in a smaller area than nonvolatile memory that is rewritable by applying voltage.

By using a RC oscillator circuit 320 driven by a constant voltage as the temperature sensor 31, a signal of a frequency corresponding to the environmental temperature is output from the RC oscillator circuit 320, and the temperature can be easily detected from the frequency. In addition, because the drive current of the temperature sensor 31 is determined by a constant current, the current can be easily controlled by the design, and a low current consumption configuration can be easily achieved.

Furthermore, if the current consumption is low, voltage sufficient to drive the IC can be generated even when the mechanical energy from the spring is weak, and the autonomy of the electronically controlled mechanical timepiece 1 can be improved.

Embodiment 2

Figure 15:
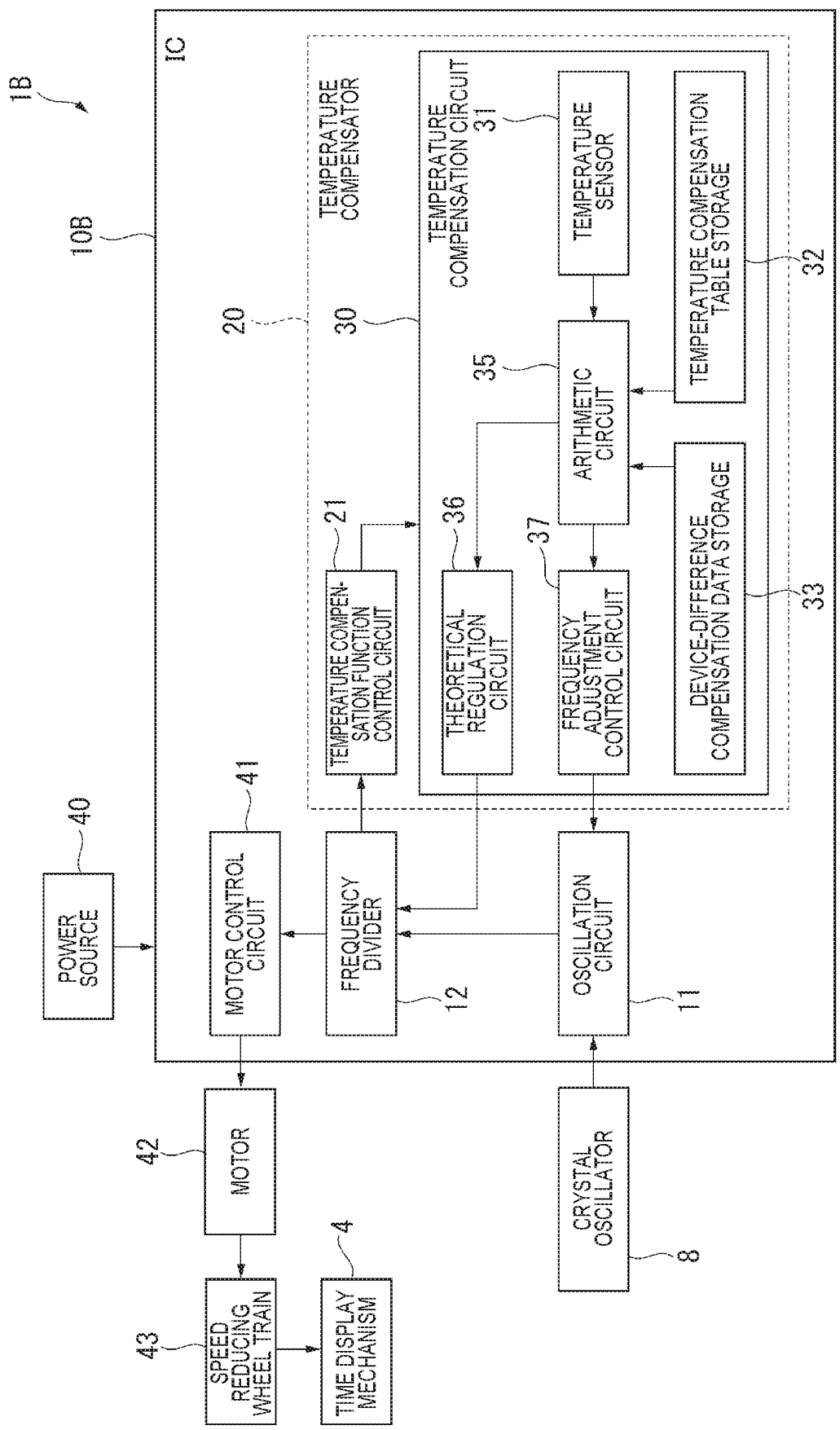
FIG. 15 is a block diagram illustrating the configuration of main parts of an electronic timepiece according to a second embodiment of the invention.

An electronic timepiece 1B according to the second embodiment of the invention is described below with reference to FIG. 15. Note that like configurations in this electronic timepiece 1B and the electronically controlled mechanical timepiece 1 according to the first embodiment of the invention are identified by the same reference numerals, and further description thereof is omitted.

This electronic timepiece 1B is an analog quartz timepiece having an IC 10B for keeping time, a power source 40 that drives the IC 10B, a crystal oscillator 8, a motor 42, a speed reducing wheel train 43 driven by the motor 42, and a time display mechanism 4 connected to the speed reducing wheel train 43 for displaying time.

The power source 40 is configured by a primary battery or storage battery, and when configured by a storage battery, preferably includes a charging device for charging the storage battery, such as a solar cell or generator using a rotor.

Like the rotation controller 10 in the first embodiment, IC 10B is an IC manufactured in a SOI (Silicon on Insulator) process, and is configured including an oscillation circuit 11, frequency divider 12, motor control circuit 41, and temperature compensator 20.

The crystal oscillator 8, oscillation circuit 11, and frequency divider 12 are configured as in the first embodiment. The frequency divider 12 frequency divides the oscillation signal, generates a clock signal of a specific frequency, and outputs to the motor control circuit 41. The motor control circuit 41, based on the input clock signal, drives the motor 42.

The temperature compensator 20 has the same configuration as in the first embodiment, and includes a temperature compensation function control circuit 21 and temperature compensation circuit 30.

The temperature compensation function control circuit 21 has the same configuration as in the first embodiment, and drives the temperature compensation circuit 30 to operate at a specific time.

The temperature compensation circuit 30 includes a temperature sensor 31, temperature compensation table storage 32, device-difference compensation data storage 33, arithmetic circuit 35, theoretical regulation circuit 36, and frequency adjustment control circuit 37, is configured the same as in the first embodiment, and further description thereof is omitted.

In the first embodiment described above the constant voltage circuit 15 drives circuits other than the external device interface (rotation detection circuit 13), temperature compensation table storage 32, and device-difference compensation data storage 33, but the electronic timepiece 1B according to the second embodiment of the invention does not have a constant voltage circuit, and the IC 10B is driven by the power source 40.

Effect of Embodiment 2

Because this embodiment has the same temperature compensator 20 as in the first embodiment, this embodiment has the same effect as the first embodiment. For example, the precision of the clock signal output from the frequency divider 12 can be improved even when the temperature of the environment in which the electronic timepiece 1B is being used deviates from the reference temperature (25° C.), the drive precision of the motor 42 by the motor control circuit 41 can be improved, and the accuracy of the time indicated by the time display mechanism 4 can be improved. Therefore, a high precision, annual rate electronic timepiece 1B can be provided.

As in the first embodiment, the temperature compensation table storage 32 and device-difference compensation data storage 33 can be connected through a first switch and a second switch (not shown in the figure) to the power source 40 only when reading compensation data, can be isolated from the power source 40 at other times, and leakage current when not operating can therefore be reduced. As a result, the current consumption of the IC 10B can be reduced, wear on the primary battery or storage battery can be reduced, and the autonomy of the electronic timepiece 1B can be improved.

Embodiment 3

Figure 16:
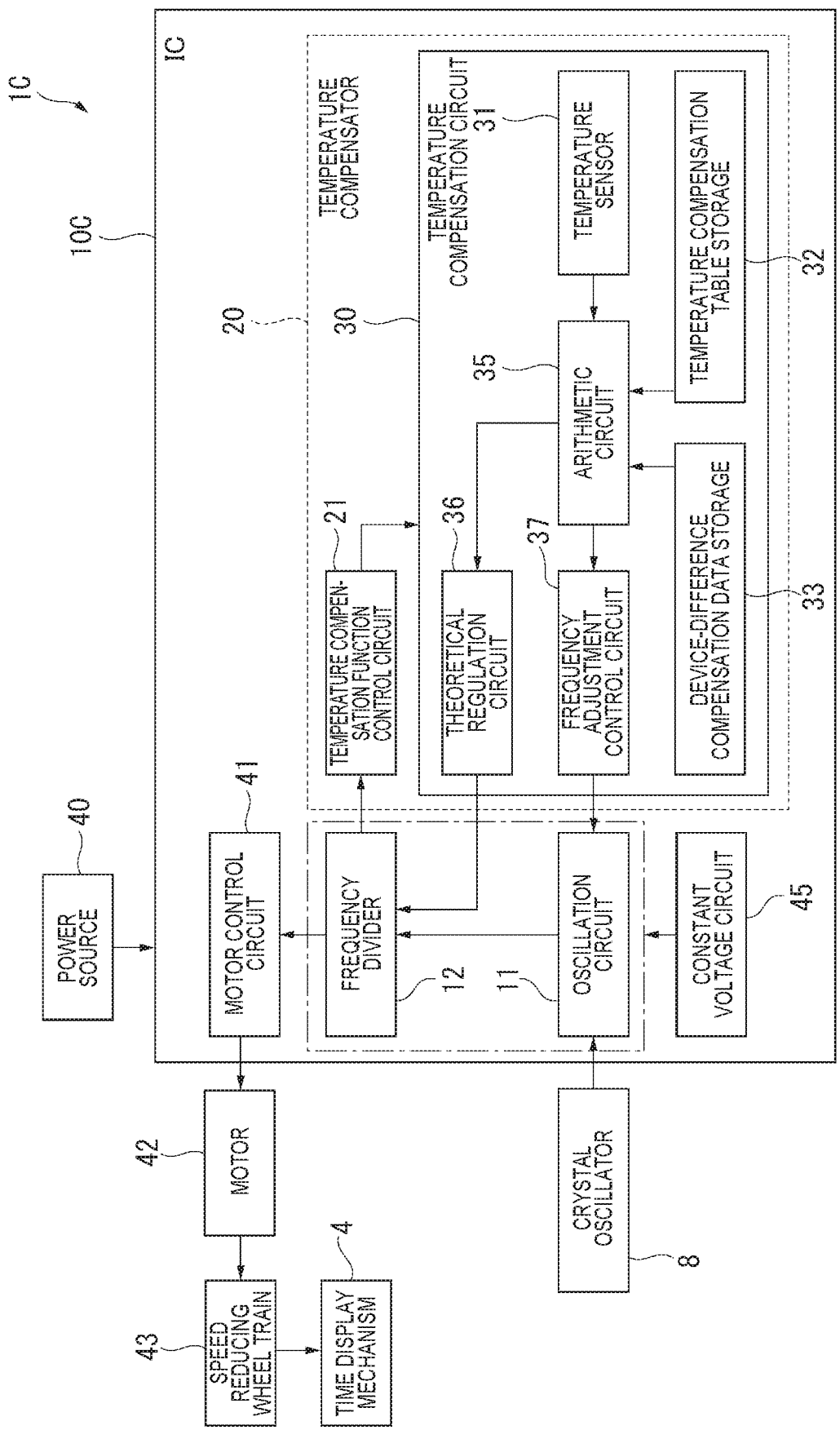
FIG. 16 is a block diagram illustrating the configuration of main parts of an electronic timepiece according to a third embodiment of the invention.

An electronic timepiece 1C according to a third embodiment of the invention is described next with reference to FIG. 16. This electronic timepiece 1C differs from the electronic timepiece 1B of the second embodiment in having a constant voltage circuit 45 disposed to the IC 10C of the electronic timepiece, and is otherwise the same as electronic timepiece 1B. Only the configurations that differ from the electronic timepiece 1B are therefore described below.

Like the constant voltage circuit 15 of the first embodiment, this constant voltage circuit 45 is a circuit that converts an external voltage supplied from the power source 40 to a constant voltage, and supplies a constant voltage. The constant voltage circuit 45 of the electronic timepiece 1C drives the oscillation circuit 11 and frequency divider 12.

Effect of Embodiment 3

Because the electronic timepiece 1C of the third embodiment has the same temperature compensator 20 as the electronically controlled mechanical timepiece 1 and electronic timepiece 1B described above, the electronic timepiece 1C of the third embodiment has the same effect as the first and second embodiments.

Furthermore, because a constant voltage circuit 45 that drives the oscillation circuit 11 and frequency divider 12 is provided, the oscillation circuit 11 and frequency divider 12 can be driven with a constant voltage having little voltage fluctuation, and current consumption can be reduced.

Yet further, because the oscillation circuit 11 is driven by a constant voltage, variation in the output signal of the oscillation circuit 11 can be suppressed even if the output voltage of the power source 40 changes, and a drop in precision due to voltage fluctuations can be prevented.

In addition, because the temperature compensation table storage 32 and device-difference compensation data storage 33 are not driven by the constant voltage circuit 45 that drives the oscillation circuit 11, variation in the constant voltage due to the current load when driving the temperature compensation table storage 32 and device-difference compensation data storage 33 can be eliminated. As a result, a configuration having a low constant voltage setting, low current consumption, and ideal for a high precision electronic timepiece 1C can be provided.

Other Examples

The invention is not limited to the embodiments described above, and can be modified and improved in many ways without departing from the scope of the accompanying claims.

The temperature compensator 20 requires only a temperature sensor 31, a theoretical regulation circuit 36, a frequency adjustment control circuit 37, and an arithmetic circuit 35, and the method whereby the arithmetic circuit 35 calculates compensation based on the measured value from the temperature sensor 31 is not limited to using the temperature compensation data table and the device-difference compensation data stored in the temperature compensation table storage 32 and device-difference compensation data storage 33.

For example, instead of using a common temperature compensation data table common to each electronically controlled mechanical timepiece 1, a temperature compensation data table of compensation data specific to an individual timepiece may be compiled and stored in nonvolatile memory. In addition, instead of using a temperature compensation data table, compensation may be calculated using a relational expression indicating the relationship between temperature and frequency.

In the embodiments described above, the temperature measurement period when the temperature sensor 31 operates, the temperature compensation data read period, and the device-difference compensation data read period are set to non-overlapping times, but may be set to overlap in part. For example, when the voltage of the power supply circuit 7 is relatively high, the temperature measurement period may be set to overlap in part with the temperature compensation data read period or the device-difference compensation data read period.

In addition, the temperature sensor 31 is not limited to using a RC oscillator circuit 320, and may be configured in any way enabling incorporation in an electronically controlled mechanical timepiece 1.

The objects driven by the constant voltage circuit 15 are not limited to the examples in the first and third embodiments, and may be determined appropriately according to the configuration.

The temperature compensator 20 is also not limited to an IC manufactured in an SOI process, and may be configured appropriately according to the embodiment.

The temperature compensation table storage 32 is also not limited to a mask ROM configuration. The device-difference compensation data storage 33 is also not limited to a FAMOS configuration. These may also be desirably configured according to the embodiment.

The temperature compensation table storage 32 and device-difference compensation data storage 33 are also not limited to being driven by the power supply circuit 7. A constant voltage circuit other than the constant voltage circuit 15 may also be used.

An electronic timepiece according to the invention is not limited to an analog quartz timepiece, and may be a digital quartz timepiece, or a combination quartz timepiece having both an analog quartz timepiece and digital quartz timepiece display functions.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronically controlled mechanical timepiece comprising:
   a mechanical energy source;
   a generator including a rotor driven by the mechanical energy source;
   a power supply circuit configured to store electrical energy generated by the generator;
   an energy transfer mechanism configured to transfer torque from the mechanical energy source to the rotor;
   a time display device connected to the energy transfer mechanism and configured to display time;
   a crystal oscillator; and
   a rotation controller configured to control rotation of the rotor and including:
      an oscillation circuit that causes the crystal oscillator to oscillate,
      a frequency divider that frequency divides an oscillation signal output from the oscillation circuit and outputs a reference signal,
      a temperature compensator configured to compensate for variation in the reference signal due to temperature,
      a rotation detection circuit configured to measure the rotational frequency of the rotor, and
      a brake control circuit configured to control braking the rotor according to a difference between the rotational frequency of the rotor and a frequency of the reference signal;
   the temperature compensator including
      a frequency adjustment control circuit configured to control the oscillation circuit,
      a theoretical regulation circuit configured to control the frequency divider,
      a temperature detector configured to measure temperature,
      an arithmetic circuit,
      temperature compensation table storage in which temperature compensation data common to another electronically controlled mechanical timepiece is stored,
      device-difference compensation data storage in which device-difference compensation data based on a characteristic of the crystal oscillator is stored,
      a first switch configured to control connection and disconnection of the temperature compensation table storage to the power supply circuit, and
      a second switch configured to control connection and disconnection of the device-difference compensation data storage to the power supply circuit;
   the arithmetic circuit configured to calculate a compensation amount based on a measured temperature detected by the temperature detector, the temperature compensation data, and the device-difference compensation data, and output to the frequency adjustment control circuit and the theoretical regulation circuit;
   the first switch controlled to a connect state during a first power supply connection period including a temperature compensation data read period when the temperature compensation data is read from the temperature compensation table storage, and to a disconnect state when not in the first power supply connection period; and
   the second switch controlled to a connect state during a second power supply connection period including a device-difference compensation data read period when the device-difference compensation data is read from the device-difference compensation data storage, and to a disconnect state when not in the second power supply connection period.

2. The electronically controlled mechanical timepiece described in claim 1, wherein:
the rotation controller includes a constant voltage circuit;
the oscillation circuit, frequency divider, brake control circuit, temperature compensator, frequency adjustment control circuit, arithmetic circuit, and temperature detector are driven by a constant voltage output from the constant voltage circuit; and
the temperature compensation table storage and device-difference compensation data storage are driven by a power source other than the constant voltage circuit.

3. The electronically controlled mechanical timepiece described in claim 1, wherein:
the temperature measurement period when the temperature detector operates, the temperature compensation data read period, and the device-difference compensation data read period are set to different times.

4. The electronically controlled mechanical timepiece described in claim 1, wherein:
the rotation controller is configured by an IC manufactured in an SOI process; and
the device-difference compensation data storage is configured by FAMOS.

5. The electronically controlled mechanical timepiece described in claim 1, wherein:
the temperature detector is configured by a RC oscillator circuit driven by a constant current.

6. A control method of an electronically controlled mechanical timepiece including a mechanical energy source;
a generator including a rotor driven by the mechanical energy source;
a power supply circuit configured to store electrical energy generated by the generator;
an energy transfer mechanism configured to transfer torque from the mechanical energy source to the rotor;
a time display device connected to the energy transfer mechanism and configured to display time;
a crystal oscillator; and
a rotation controller configured to control rotation of the rotor and including
an oscillation circuit that causes the crystal oscillator to oscillate,
a frequency divider that frequency divides an oscillation signal output from the oscillation circuit and outputs a reference signal,
a temperature compensator configured to compensate for variation in the reference signal due to temperature,
a rotation detection circuit configured to measure the rotational frequency of the rotor, and
a brake control circuit configured to control braking the rotor according to a difference between the rotational frequency of the rotor and a frequency of the reference signal;
the temperature compensator including a temperature detector configured to measure temperature,
temperature compensation table storage in which temperature compensation data common to electronically controlled mechanical timepieces is stored,
device-difference compensation data storage in which device-difference compensation data specific to an electronically controlled mechanical timepiece is stored,
a first switch configured to control connection and disconnection of the temperature compensation table storage to the power supply circuit, and
a second switch configured to control connection and disconnection of the device-difference compensation data storage to the power supply circuit;
the control method comprising:
a step of operating the temperature detector to measure temperature;
a step of setting the first switch to a connect state, reading the temperature compensation data from the temperature compensation table storage, and setting the first switch to a disconnect state;
a step of setting the second switch to a connect state, reading the device-difference compensation data from the device-difference compensation data storage, and setting the second switch to a disconnect state;
a step of calculating a compensation amount based on a measured temperature, the temperature compensation data, and the device-difference compensation data;
a step of controlling the oscillation circuit according to the compensation; and
a step of controlling the frequency divider according to the compensation.

7. An electronic timepiece comprising:
a time display device configured to display time;
a crystal oscillator;
a power supply circuit;
an oscillation circuit that causes the crystal oscillator to oscillate;
a frequency divider that frequency divides an oscillation signal output from the oscillation circuit and outputs a reference signal; and
a temperature compensator configured to compensate for variation in the reference signal due to temperature, and including
a frequency adjustment control circuit configured to control the oscillation circuit,
a theoretical regulation circuit configured to control the frequency divider,
a temperature detector configured to measure temperature,
an arithmetic circuit,
temperature compensation table storage in which temperature compensation data common to another electronic timepiece is stored,
device-difference compensation data storage in which device-difference compensation data based on a characteristic of the crystal oscillator is stored,
a first switch configured to control connection and disconnection of the temperature compensation table storage to the power supply circuit, and
a second switch configured to control connection and disconnection of the device-difference compensation data storage to the power supply circuit;
the arithmetic circuit configured to calculate a compensation amount based on a measured temperature detected by the temperature detector, the temperature compensation data, and the device-difference compensation data, and output to the frequency adjustment control circuit and the theoretical regulation circuit;
the first switch controlled to a connect state during a first power supply connection period including a temperature compensation data read period when at least the temperature compensation data is read from the temperature compensation table storage, and to a disconnect state when not in the first power supply connection period; and the second switch controlled to a connect state during a second power supply connection period including a device-difference compensation data read period when at least the device-difference compensation data is read from the device-difference compensation data storage, and to a disconnect state when not in the second power supply connection period.

8. The electronic timepiece described in claim 7, further comprising:

a constant voltage circuit that drives the oscillation circuit by a constant voltage;

the temperature compensation table storage and device-difference compensation data storage being driven by a power source other than the constant voltage circuit.

* * * * *